(12) United States Patent
Xu et al.

(10) Patent No.: US 9,276,781 B2
(45) Date of Patent: Mar. 1, 2016

(54) POWER AND AREA EFFICIENT RECEIVER EQUALIZATION ARCHITECTURE WITH RELAXED DFE TIMING CONSTRAINT

(71) Applicants: Mingming Xu, Phoenix, AZ (US); Stefano Giacconi, Phoenix, AZ (US)

(72) Inventors: Mingming Xu, Phoenix, AZ (US); Stefano Giacconi, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/625,529

(22) Filed: Feb. 18, 2015

(65) Prior Publication Data

US 2015/0163077 A1 Jun. 11, 2015

Related U.S. Application Data

(63) Continuation of application No. 13/830,244, filed on Mar. 14, 2013, now Pat. No. 8,976,855.

(51) Int. Cl.
*H03H 7/30* (2006.01)
*H03H 7/40* (2006.01)
*H03K 5/159* (2006.01)
*H04L 25/03* (2006.01)

(52) U.S. Cl.
CPC . *H04L 25/03057* (2013.01); *H04L 2025/03471* (2013.01)

(58) Field of Classification Search
CPC ............... H04L 25/03057; H04L 2025/03471; H04L 2925/03617; H04L 2025/0349; H04L 2025/03503; H03D 3/009; H03H 21/0012
USPC ........... 375/233, 234, 235, 232; 708/322, 323
See application file for complete search history.

(56) References Cited

U.S. PATENT DOCUMENTS

| | | | |
|---|---|---|---|
| 7,822,113 B2 | 10/2010 | Tonietto et al. | |
| 7,924,912 B1 * | 4/2011 | Rokhsaz et al. | 375/233 |
| 8,107,522 B2 | 1/2012 | Aziz et al. | |
| 8,325,792 B2 * | 12/2012 | Sunaga et al. | 375/233 |
| 8,477,833 B2 | 7/2013 | Bulzacchelli et al. | |
| 8,619,848 B2 | 12/2013 | Jiang | |
| 8,879,618 B2 | 11/2014 | Abdalla et al. | |
| 8,976,855 B2 * | 3/2015 | Xu et al. | 375/233 |

OTHER PUBLICATIONS

PCT International Search Report for PCT Counterpart Application No. PCT/US2014/017221, 3 pgs., (May 27, 2014).
Agrawal, Ankur, et al., "A 19-Gb/s Serial Link Receiver With Both 4-Tap FFE and 5-Tap DFE Functions in 45-nm SOI CMOS", IEEE Journal of Solid-State Circuits, vol. 47, No. 12, Dec. 2012.

* cited by examiner

*Primary Examiner* — Phuong Phu
(74) *Attorney, Agent, or Firm* — Blakely, Sokoloff, Taylor & Zafman LLP

(57) ABSTRACT

An exemplary receiver equalizer includes a first decision feedback equalizer (DFE) sampler coupled to a summer, the first DFE to latch an equalized output of the summer. The first branch includes a second DFE sampler coupled to the first DFE sampler, the second DFE to latch an output of the first DFE sampler. The first branch includes a third DFE sampler coupled to the second DFE sampler, the third DFE to latch an output of the second DFE sampler. The summer coupled to the first, second, and third DFE samplers of the first branch, the summer to integrate the output of said DFE samplers, the received signal, and equalized outputs from one or more other branches, wherein the integrating occurs over a plurality of unit intervals (UIs).

25 Claims, 25 Drawing Sheets

1100

Latching, by a first decision feedback equalizer (DFE) sampler an equalized output of a summer.
1105

Latching, by a second DFE sampler, an output of the first DFE sampler.
1110

Latching, by a third DFE sampler, an output of the second DFE sampler.
1115

Integrating, by the summer, the output of the DFE samplers, the received signal, and equalized outputs from other branches.
1120

FIG. 11

POWER AND AREA EFFICIENT RECEIVER EQUALIZATION ARCHITECTURE WITH RELAXED DFE TIMING CONSTRAINT

CROSS-REFERENCE TO RELATED APPLICATIONS

This application is a continuation of U.S. patent application Ser. No. 13/830,244, filed on Mar. 14, 2013, which is currently pending and incorporated by reference in its entirety.

TECHNICAL FIELD

Embodiments of the present invention relate generally to methods and apparatuses for receiving data. More particularly, embodiments of the invention relate to receiving data and determining values of the received data at a power and area efficient receiver equalizer with relaxed Decision Feedback Equalizer (DFE) timing constraint.

BACKGROUND ART

In serial data communication, the channel through which information is transmitted (e.g., chip-to-chip or backplane interconnects,) imposes a limit on the bandwidth capacity, or rate at which information may pass through the channel. One significant limitation on achievable bandwidth is known as inter-symbol interference (ISI), which occurs when a portion of a signal representative of one bit of information interferes with a different portion of the signal representative of a different bit of information.

To overcome bandwidth limited chip-to-chip and backplane interconnects at high data rates, conventional high-speed transceivers implement a combination of a Decision Feedback Equalizer (DFE) on the Receiver (RX) side as well as a Feed Forward Equalization (FFE) on the Transmitter (TX) side. Although RX DFE has advantages such as not amplifying noise, it has a very strict timing constraint of one unit interval (UI) for the feedback path. Given the current transceiver data rates, one UI can be as small as 35.7 pico seconds (ps), which is very difficult to meet, even for cutting edge manufacturing processes.

For example, FIG. 1A illustrates a conventional architecture of a quarter-rate equalizer 100 comprising DFE samplers 031-034 for sampling/determining the value of an incoming signal based on the current integration performed by main taps 011-014 and DFE taps 021-024. The DFE taps 021-024 are constrained to integrate the current of signals from various DFE samplers 031-034 within one UI from when the sampler inputs become available.

A few techniques have been adopted in the industry to mitigate this timing constraint. For example, time-interleaving techniques such as half-rate or quarter-rate architecture can relax the DFE timing constraint for the second DFE tap and onward, but the DFE first tap timing constraint remains at one UI. Although loop unrolling can eliminate the analog settling time from the one UI timing constraint, loop unrolling adds incurs additional hardware resources, and also results in more power dissipation.

Recent transceiver designs use FFE in the TX side to equalize part of the channel losses. There are several drawbacks of putting FFE on the TX side. The first significant impact is related to the limit on the amplitude of the transmitted signal on the TX side. This limitation on the amplitude implies that, when equalization is used, the total energy sent from the TX to the far end receiver (RX) is reduced.

Conventional architectures implement back-channel communication between the RX and TX as a way to tune the TX FFE coefficients following the RX requests. Back-channel communication costs extra hardware. Additionally, it can be difficult to find a combined optimal solution for FFE and DFE, given a long feedback latency of the back-channel, as well as the limited resolution of the far-end TX. Moreover, after channel attenuation and reflection, TX FFE becomes less effective as compared to directly applying FFE in the far end RX. Given these and other disadvantages, putting FFE on the RX side is becoming more popular.

The impact of pre-cursor ISI on receiver performance becomes significant for interconnects operating at 10 Gbps and above. The higher the link speed, the higher the potential impact of the pre cursor ISI on the recovered eye diagram. An eye diagram is generated by superimposing a stream of pulses of "0's" and "1's." Ideally, an eye diagram has a rectangular shape because the "0's" and "1's" pulses have perfect edges (i.e., zero rise and fall time). Due to ISI, the received pulses become imperfect, and the resulting diagram looks more like an "eye." As ISI increases, the eye diagram looks more and more like a closed/narrower eye. Received signals having a closed-eye characteristic are less effective in driving the FFE filter, resulting in an equalizer having little benefit.

Unlike DFE, which can only equalize post cursors of impulse response, FFE is able to equalize pre cursors as well. Conventional architectures of RX FFE require analog elements (such as inductors and capacitors) in order to create a one UI distance between taps. These analog elements typically occupy a large area and are difficult to integrate into a System-on-Chip (SOC). Furthermore, at very high speeds, the insertion loss is significant, leading to a closed eye diagram at the receiver pads even, after a Continuous Time Linear Equalizer (CTLE) has been applied to the input signal.

More recently, some equalizers implement FFE filters by feed forwarding the input signal held at the SNH directly to the current integration logic. Such conventional architectures also result in a closed eye at the receiver at high data rates because the insertion loss is significant at high speeds. For example, the quarter-rate equalizer 101 of FIG. 1B consists of pre/post cursor taps 131-134 for integrating the current of the outputs of sample and hold (SNH) 121-124. As used herein, current integration refers to the process of summing/adding current onto a capacitive load. As illustrated, SNH 121-124 outputs are based on un-equalized outputs of SNH 101-104. Thus, the performance of pre/post cursor taps 131-134 is reduced because they integrate based on un-equalized signals, resulting in a closed eye at the receiver at high data rates.

BRIEF DESCRIPTION OF THE DRAWINGS

Embodiments of the invention are illustrated by way of example and not limitation in the figures of the accompanying drawings in which like references indicate similar elements.

FIG. 11 is a flow diagram illustrating an exemplary method of determining a value of a received data signal.

DETAILED DESCRIPTION

In accordance with an embodiment of the present invention, an input signal is received by a receiver. In order to recover the signal, i.e., compensate for channel impairments, the signal is processed by an equalizer. In one embodiment, the equalizer includes four (4) branches. The four branches enable the equalizer to process the signal in a time-interleaving manner, thus, allowing the equalizer to operate at one-quarter of the data rate. Each branch includes a current integration summer (summer), for integrating the current corresponding to the input signal onto load capacitances. In order to optimize and improve performance of the equalizer, various FFE taps are fed with a signal that has been fully equalized, which makes FFE taps behave very similarly to DFE taps, resulting in a more accurate integration, and thus a more accurate determination of whether the incoming signal is a "0" or "1." In one embodiment, post cursor tap 1, post cursor tap 2 and pre cursor tap 1 are implemented by FFE, eliminating the one UI timing constraint in conventional DFE implementation. The clocking structure of the branches are designed such that the DFE timing constraint for DFE tap 3 and up is relaxed to at least two UIs.

Throughout the description, a receiver equalization architecture is described based on the conventional quarter rate with current integration summer. However, it will be appreciated that the equalizer of the present invention is not so limited, and the techniques described herein are equally applicable to other architectures, e.g., $1/16^{th}$, $1/8^{th}$, half-rate, full-rate, etc.

Throughout the description, references are made to the figures, in which like numerals represent the same or similar elements. The figures and description of the present specification reference pairs of signals that are identical except for their polarities. Polarities are identified by a "p" or "n" identifier. For example, Vin_p is the same signal as Vin_n, except that Vin_p has the positive polarity while Vin_n has the negative polarity. At times, the description and Figures may refer to such signals without the added identifier. In such instances, it will be understood that the reference is made with respect both polarities collectively. Thus, for example, a reference to Vin shall mean that both Vin_p and Vin_n are being referred to.

Figure 2:
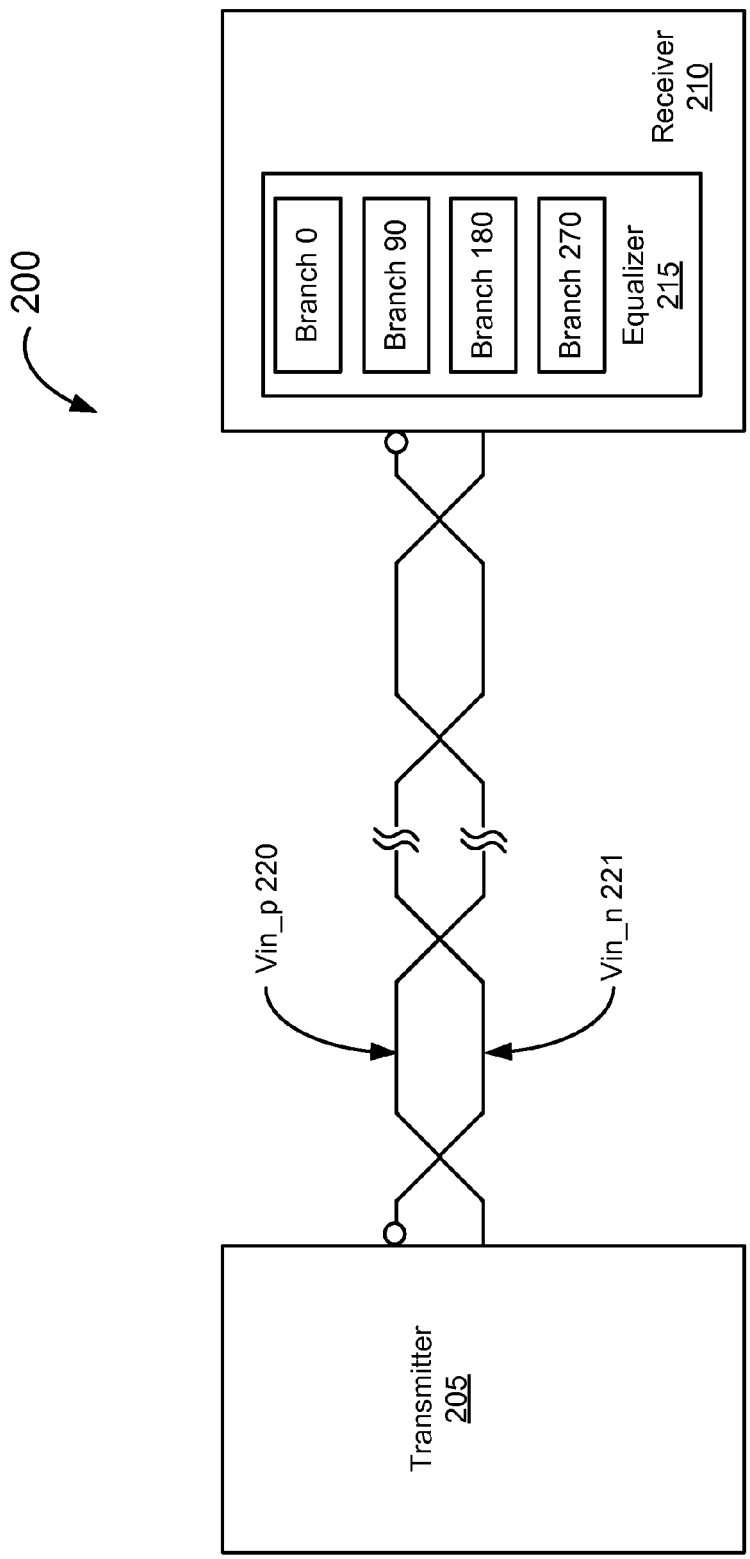
FIG. 2 is a block diagram illustrating an embodiment of a communication system.

FIG. 2 is a block diagram illustrating an embodiment of a high-speed communications system 200. System 200 includes a transmitter 205 for transmitting differentially encoded signals Vin_p 220 and Vin_n 221, which may be collectively referred to as Vin, over a communication channel. System 200 further includes receiver 210 for receiving Vin from transmitter 205. Receiver 210 includes equalizer 215. In one embodiment, equalizer 215 includes four branches (illustrated as branch 0, 90, 180, and 270) that time-interleave the processing of incoming Vin signal. Alternatively, equalizer 215 may include more or less than four branches. As used herein, time-interleaving refers to each of the branches processing one bit (e.g., determine the value of an incoming Vin signal,) while the other branches process the subsequent bits represented by Vin during the subsequent intervals. By way of example, a stream of four bits may be represented by Vin arriving at receiver 210 in the order {1, 0, 1, 1}. Depending on the current phase of the clocks, branch 0 of equalizer 215 may process the first bit ("1"), branch 90 processes the second bit ("0"), branch 180 processes the third bit ("1"), and branch 270 processes the fourth bit ("1"). By time-interleaving, equalizer 215 is able to process the incoming signals at a lower clock frequency than the data rate (e.g., a quarter of the data rate when the receiver includes four branches).

Figure 3A:
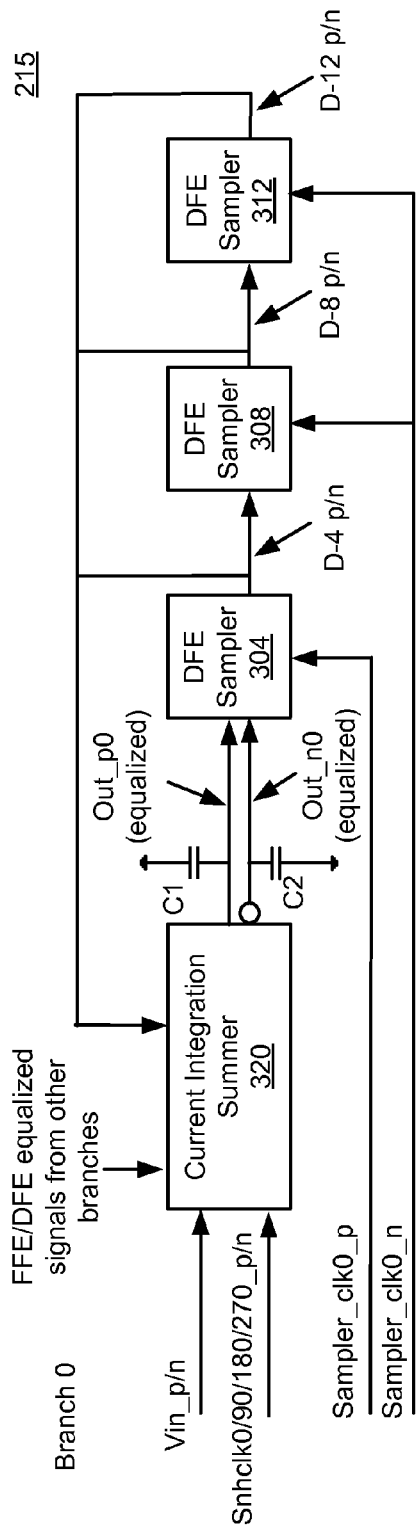
FIGS. 3A-3D are block diagrams illustrating an embodiment of an equalizer.

FIGS. 3A-3D illustrate one embodiment of equalizer 215. FIG. 3A illustrates branch 0 of equalizer 215 having current integration summer 320 receiving input clocks snhclk0_p, snhclk0_n, snhclk90_p, snhclk90_n, snhclk180_p, snhclk180_n, snhclk270_p, and snhclk270_n (collectively illustrated as "snhclk0/90/180/270_p/n"). Branch 0 further includes DFE sampler 304 clocked by sampler_clk0_p, and DFE samplers 308 and 312, both clocked by sampler_clk0_n. In one embodiment, the clocks have frequencies and duty cycles relative to each other as illustrated in FIG. 4. For example, snhclk90_p rises as snhclk0_p falls; shnclk180_p rises as snhclk90_p falls; snhclk270_p rises snhclk180_p falls; and snhclk0_p rises snhclk270_p falls. It should also be noted that snhclk0_n, snhclk90_n, snhclk180_n, and snhclk270_n have similar timing relationship, except that they have opposite polarities to snhclk0_p, snhclk90_p, snhclk180_p, and snhclk270_p, respectively. It should also be further noted that sampler_clk0_p, sampler_clk90_p, sampler_clk180_p, and sampler_clk270_p have the same frequency as clocks snhclk0_p, snhclk90_p, snhclk180_p, and snhclk270_p, respectively; the difference between these clocks lies in their duty cycles (e.g., "snhclk" clocks have 25% duty cycles while "sampler_clk" clocks have 50% duty cycles). Additionally, it should be noted that sampler_clk0_n, sampler_clk90_n, sampler_clk180_n, and sampler_clk270_n have the same frequency as sampler_clk0_p, sampler_clk90_p, sampler_clk180_p, and sampler_clk270_p, except that they have opposite polarities. For example, sampler_clk0_p has the opposite polarity as sampler_clk0_n. Throughout the description, references are made to "UI" (Unit interval between two adjacent incoming bits). In one embodiment, an UI is the time period when one of the "snhclk" clocks (e.g., snhclk0_p, snhclk90_p, etc.) is HIGH.

Figure 5:
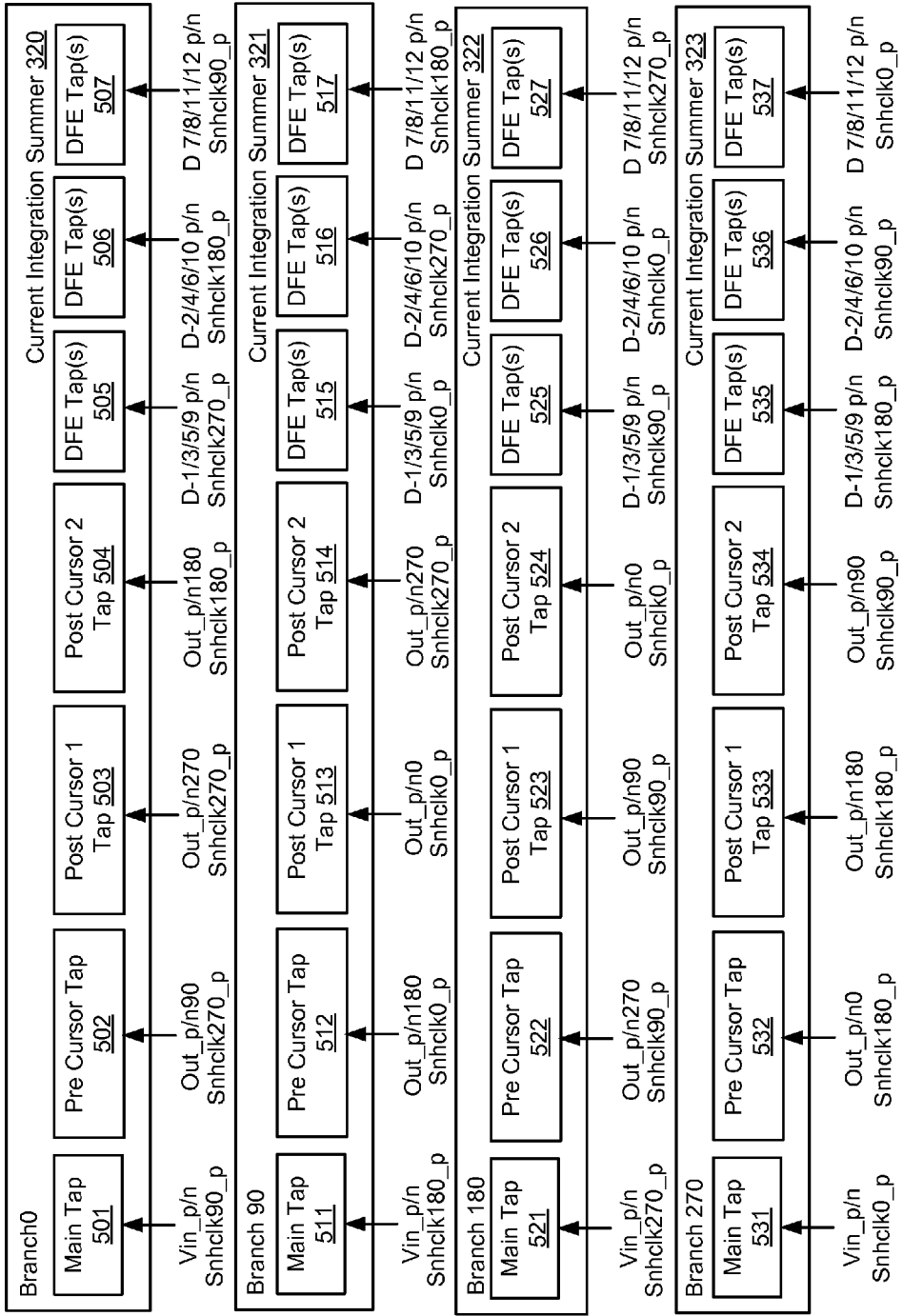
FIG. 5 is a block diagram illustrating an embodiment of an equalizer.

In one embodiment, summer 320 includes current integration taps, such as those shown in FIG. 5, for integrating the current corresponding to Vin_p and Vin_n onto load capacitances C1 and C2, respectively. For example, when a "1" is received, load capacitance C1 will be charged to a higher voltage than the voltage in load capacitance C2 during each of the integration periods. On the other hand, if an input "0" is received, load capacitance C2 will be charged to higher voltage than the voltage in load capacitance C1 during each of the integration periods. In one embodiment, the input signals Vin_p/n have been equalized by a continuous time linear equalizer (CTLE), not shown in FIG. 3A. Summer 320 integrates the current corresponding to signals that have been FFE and/or DFE equalized by another branch (e.g., out_p/n90 of branch 90, out_p/n180 of branch 180, and out_p/n270 of branch 270).

As illustrated in FIG. 3A, summer 320 includes differential output nodes out_p0 and out_n0 communicatively coupled to load capacitances C1 and C2, respectively. These differential nodes out_p/n0 are fully equalized by summer 320 by the time they are used by another branch. As used herein, "fully equalized" refers to all taps within a summer having completed their current integration process. Output nodes out_p/n0 are received by DFE sampler 304, which makes a determination of whether $V_{in}$ is a "0" or a "1" based on the difference between the voltages of equalized signals out_p0 and out_n0. For example, if the difference between out_p0 and out_n0 is positive, DFE sampler 304 determines that the incoming signal is a "1," and drives a "1" to its output node D-4. On the other hand, if the difference results in a negative value, DFE sampler 304 determines that the incoming signal is a "0" and drives a "0" to its output node D-4. Branch 0 further includes DFE sampler 308 which drives its output D-8 based on the received D-4 value. In one embodiment, branch 0 also includes DFE sampler 312 for driving its output node D-12 based on received D-8 signal. According to one embodiment, DFE samplers 304 may be implemented as Sense-Amplifier Flip-Flop (SAFF), 308, and 312 may be implemented as conventional flip-flops, which are clocked by sampler_clk0_p, sampler_clk0_n, and sampler_clk0_n, respectively. For example, DFE sampler 304 may be clocked by sampler_clk0_p, and DFE sampler 308 and 312 may be clocked by sampler_clk0_n.

According to one embodiment, the integration (i.e., summation) of current onto load capacitances C1 and C2 is accomplished in stages, each stage corresponding to one UI, i.e., a period of time when one of input clocks snhclk0/90/180/270_p is HIGH. Conventional equalizers implement FFE filters by feed forwarding the input signal Vin held at the sample and hold ("SNH") directly to the current integration logic. Such conventional architectures result in a closed eye at the receiver at high data rates because the insertion loss is quite significant at high speeds. Unlike conventional equalizers, summer 320 implements an FFE filter that compensates for ISI by integrating signals that have been equalized, resulting in wider eye openings as compared to architectures which utilize signals directly from the SNH. For example, summer 320 performs integration of signals that have been equalized by the various DFE and FFE taps of the branches. Details of which FFE and DFE equalized signals are integrated during a particular UI shall become apparent through the discussion below.

Figure 3B:
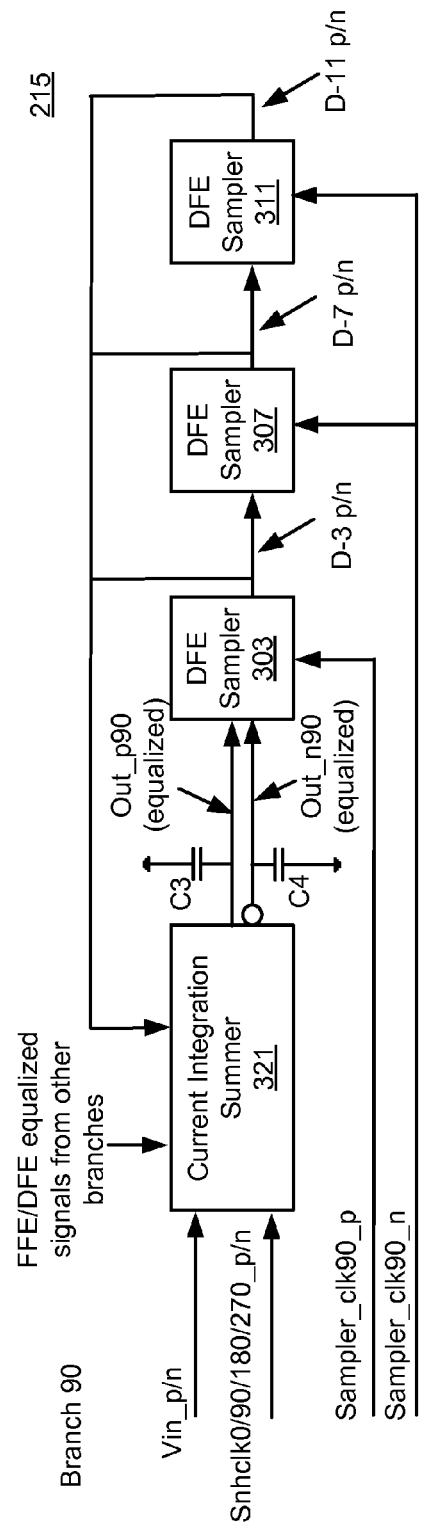
Figure 3C:
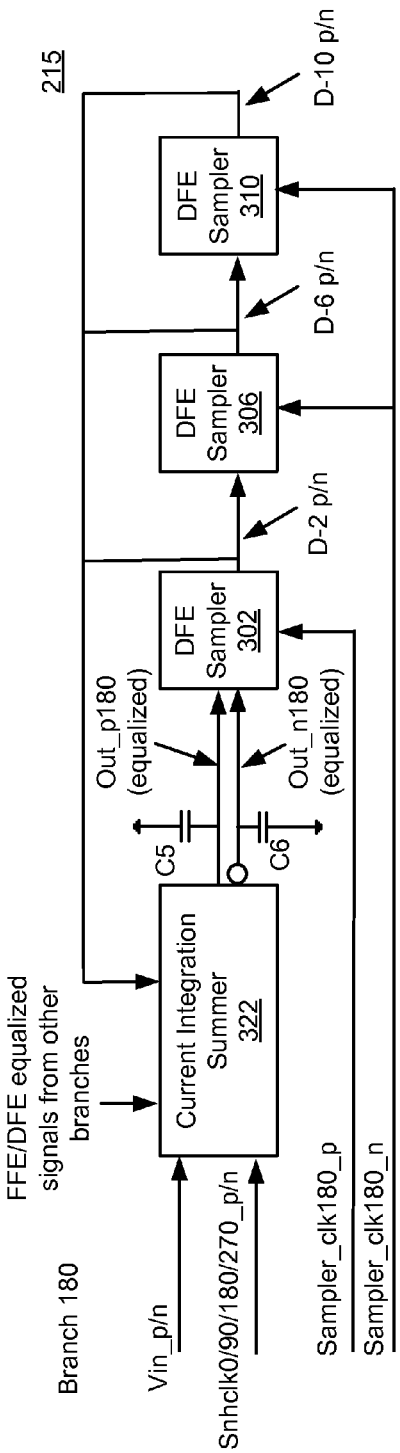
Figure 3D:
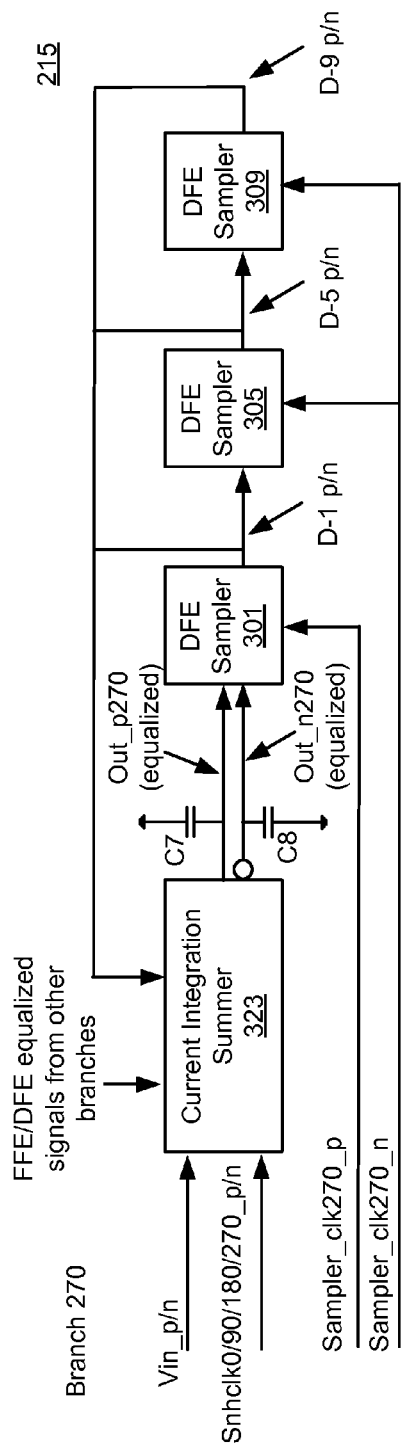
Figure 4:
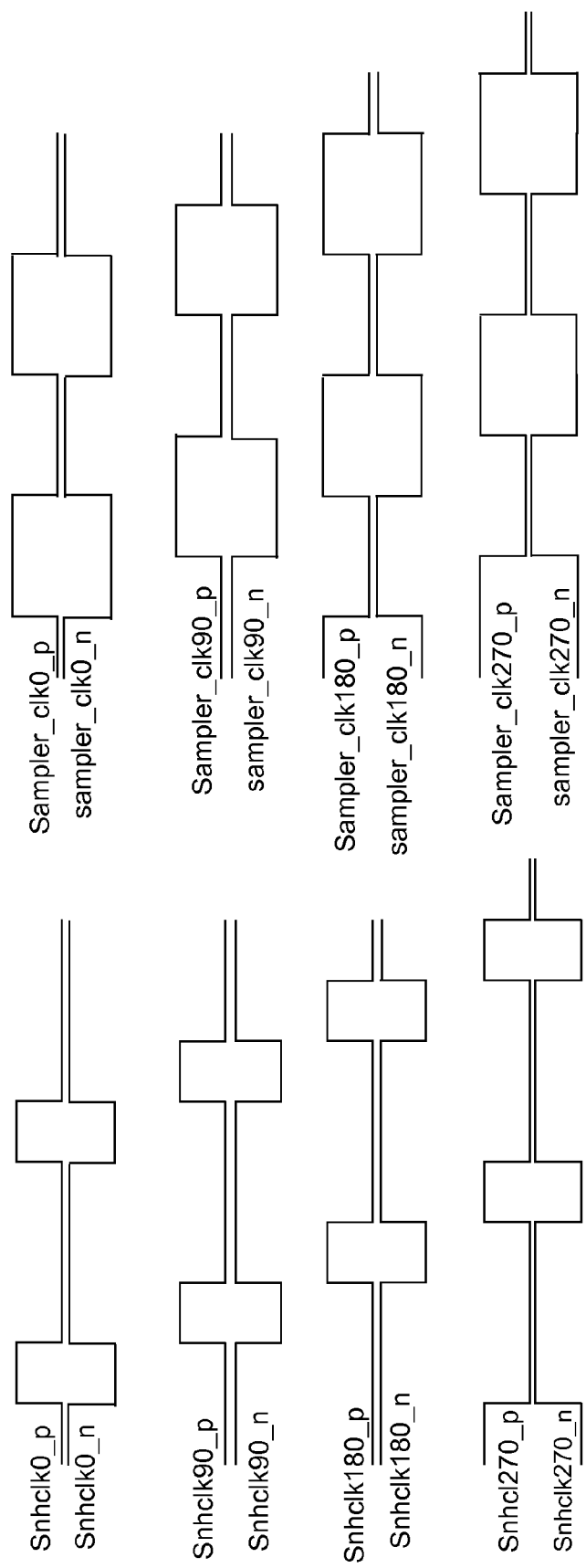
FIG. 4 is a timing diagram illustrating an embodiment of the timing relationship between clocks.

FIGS. 3B-3D are block diagrams illustrating one embodiment of branch 90, 180, and 270 of equalizer 215, respectively. These three branches implement current integration summer and DFE sampler logic similar to those described herein with respect to FIG. 3A. Examples of which taps are enabled for integration during which stage (i.e., UI) are described in further detail below.

FIG. 5 is a block diagram illustrating an embodiment of equalizer 215, including the various taps of summers 320-323. For example, summer 320 includes a main tap 501, pre cursor tap 502, post cursor 1 tap 503, post cursor 2 tap 504, and various DFE taps 505-507. In one embodiment, each tap includes sample and hold (SHN) logic (not shown) that samples and holds the signal to be integrated. In such an embodiment, the signal is started to be sampled one UI prior to the UI in which the signal is integrated. For example, main tap 501 may include SNH logic for sampling Vin_p/n during the period when snhclk0_p is HIGH ("1"), which is one UI prior to when snhclk90_p is HIGH; SNH logic then holds the sampled signal when snhclk0_p is LOW, which is integrated by main tap 501 during the UI when snhclk90_p is HIGH. FIG. 4 illustrates the timing relationship between the clocks.

As described above, the integration current corresponding to a signal occurs over several, e.g., four stages (UIs). Each stage/UI corresponds to the enabling of one or more of the taps illustrated in FIG. 5. According to one aspect of the invention, a tap is enabled by an input clock, e.g., when the clock is "1." Furthermore, each tap integrates the current of a different input signal, e.g., the integrated signal may be the incoming signal Vin_p/n, or an equalized signal from another branch (e.g., output signals out_p/n0, out_p/n90, out_p/n180, and/or out_p/n270), and/or a DFE sampled signal from one of the branches. As illustrated, main tap 501 integrates the current corresponding to Vin_p/n onto load capacitances C1/C2, respectively, during the UI when snhclk90_p is HIGH; pre cursor tap 502 integrates the current corresponding to out_p/n90 (equalized output from branch 90) during the UI when snhclk270_p is HIGH; post cursor 1 tap 503 integrates the current corresponding to out_p/n270 (equalized output from branch 270) during the UI when snhclk270_p is HIGH; post cursor 2 tap 504 integrates the current corresponding to out_p/n180 (equalized output from branch 180) during the UI when snhclk180_p is HIGH; DFE taps 505 integrates the current corresponding to D-1, D-5, and D-9 (from branch 270), and D-3 (from branch 90) during the UI when snhclk270_p is HIGH; DFE taps 506 integrates the current corresponding to D-2, D-6, and D-10 (from branch 180), and D-4 (from branch 0) during the UI when snhclk180_p is HIGH; and DFE taps 507 integrates the current corresponding to D-7 and D-11 (from branch 90), and D-8 and D-12 (from branch 0), during the UI when snhclk90_p is HIGH. In one embodiment, each of DFE taps 505-507 correspond to four DFE taps because each is responsible for integrating current corresponding to four input DFE sampled signals.

Figure 1A:
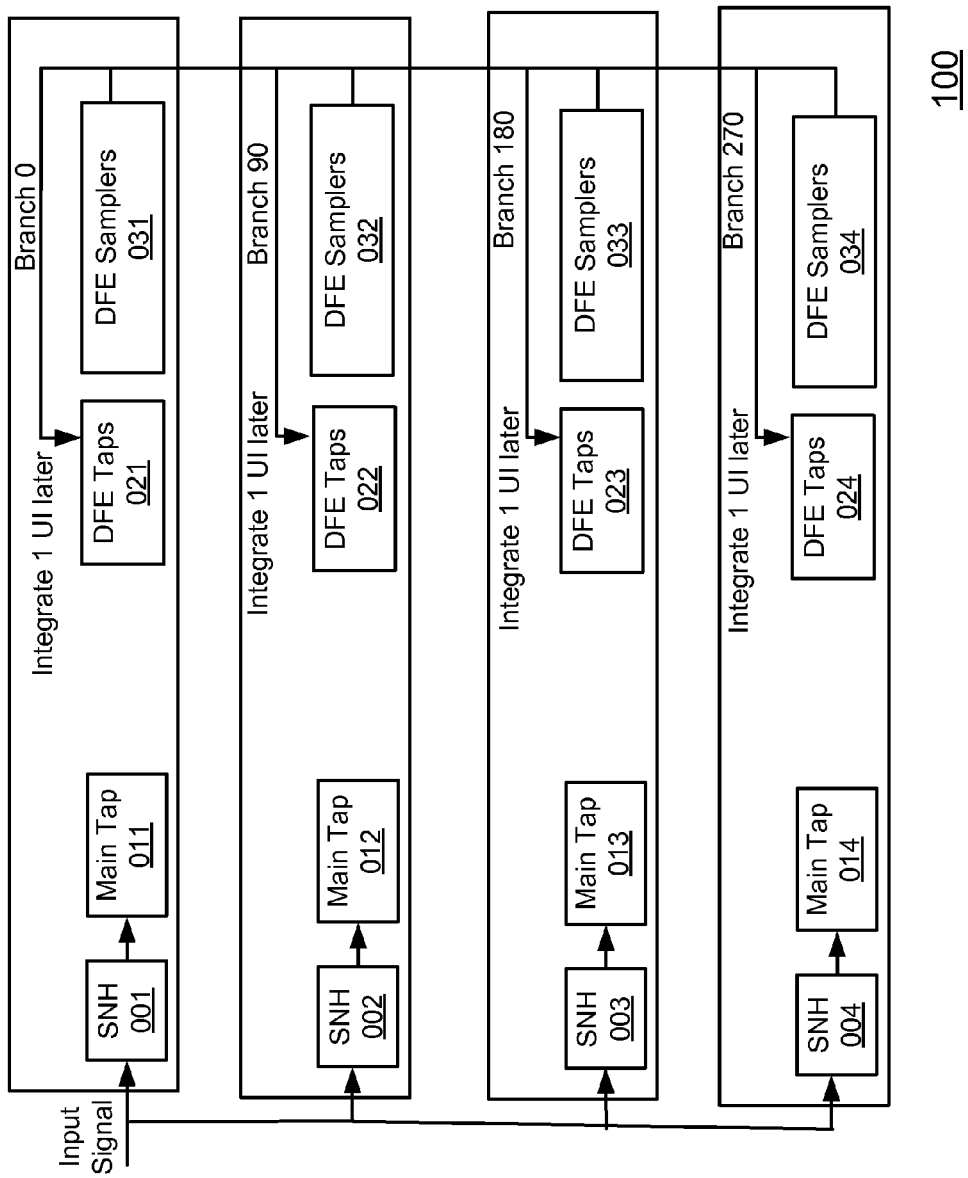
FIG. 1A is a block diagram illustrating a conventional architecture of an equalizer.
Figure 1B:
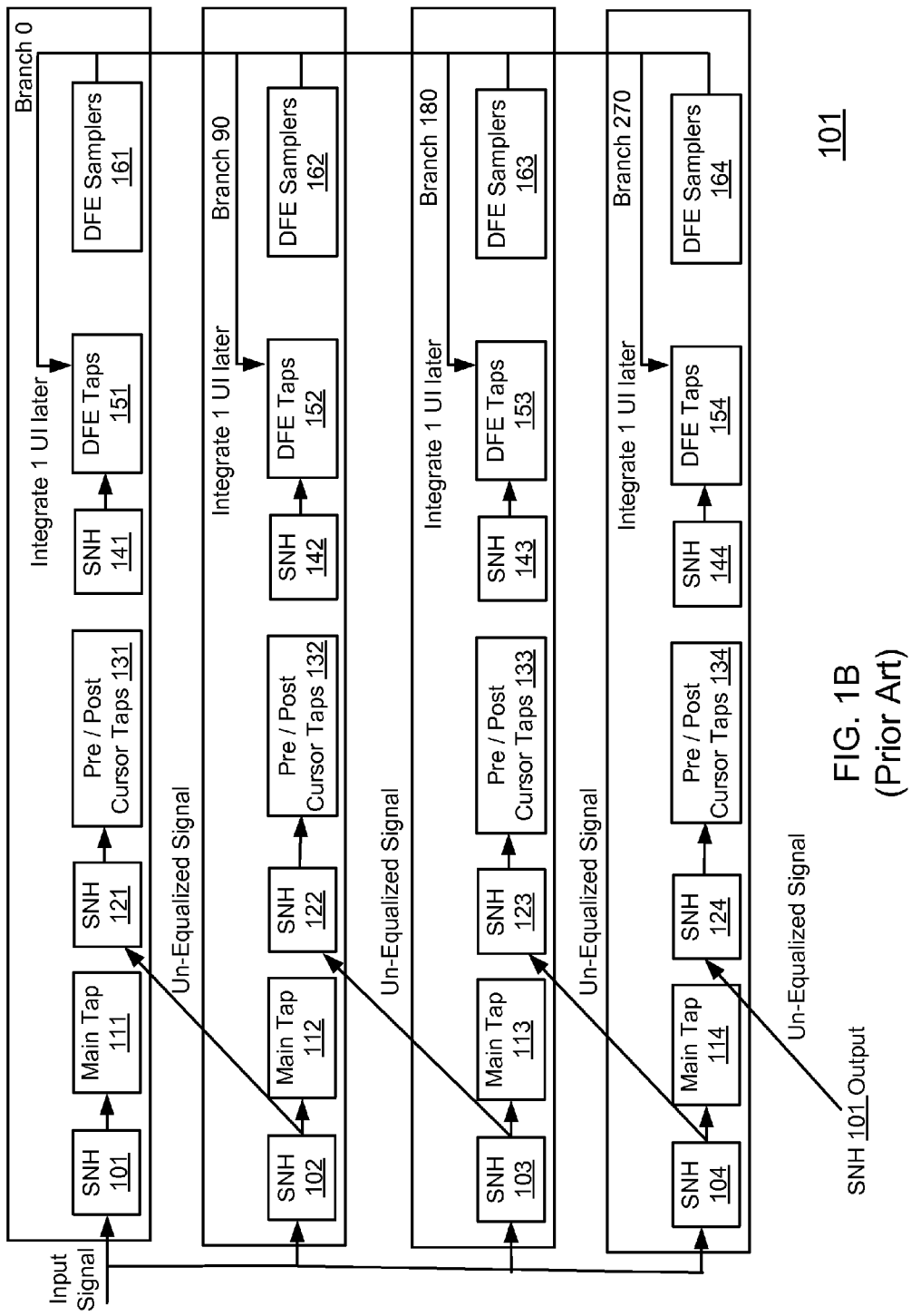
FIG. 1B is a block diagram illustrating a conventional architecture of an equalizer with RX side FFE

Pre cursor tap 502 integrates the current of an equalized signal out_p/n90, which results in a wider eye opening than conventional architectures, where the conventional pre cursor tap typically integrates the current corresponding to an output of the SNH of a main tap from another branch. For example, a pre cursor tap of a conventional equalizer (such as pre/post cursor tap 131 of FIG. 1B) may integrate the current corresponding to the SNH output of a main tap (such as SNH 102 of FIG. 1B).

Post cursor 1 tap 503 integrates the current corresponding to equalized signal out_p/n270, which results in a wider eye than conventional architectures. In a conventional equalizer architecture, a post cursor 2 tap typically integrates the SNH output of a pre cursor tap. The same advantages of integrating equalized signals can be said of the remaining pre and post cursor taps. The taps of summers 321-323 integrate the current of signals during the UIs as illustrated in FIG. 5 using similar methods as discussed herein with respect to summer 320.

Figure 6A:
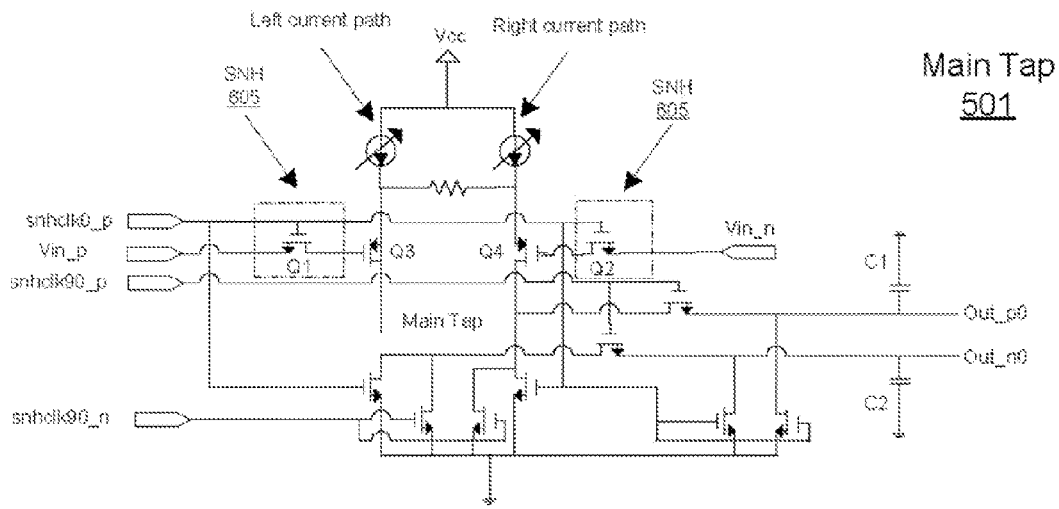
FIGS. 6A-6G are block diagrams illustrating an embodiment of branch 0.

FIGS. 6A-6G are block diagrams illustrating the various taps of summer 320 (branch 0) as illustrated in FIG. 5. For example, FIG. 6A illustrates one embodiment of main tap 501. Main tap 501 includes transistors which are enabled when snhclk0_p is HIGH, resulting in the resetting/discharging of load capacitors C1 and C2 to Ground. In one embodiment, main tap 501 includes SNH 605 that tracks Vin_p/n (i.e., passes Vin_p/n from source to drain of Q1/Q2, respectively) when clock snhclk0_p is HIGH. When snhclk0_p switches LOW, the signals Vin_p/n are latched at the SNH output nodes (gates of Q3 and Q4, respectively), and will not be affected by further transitions by Vin_p/n. The output of SNH 605 determines the gate voltage of Q3/Q4. The gate voltage of Q3/Q4 regulate the amount of current (acting as differential pair) charging capacitance C1 and C2. For example, if the incoming differential Vin is positive (i.e., Vin_p>Vin_n), the current flowing through the drain of Q4 (charging capacitance C1) is larger than the current flowing though the drain of Q3 (charging capacitance C2), resulting in a positive differential output voltage (i.e., Out_p0–Out_n0>=0). Otherwise, if Vin is negative (i.e., Vin_p<Vin_n), the current flowing through the drain of Q4 (charging capacitance C1) is smaller than the current flowing though the drain of Q3 (charging capacitance C2), resulting in a negative differential output voltage (i.e., Out_p0–Out_n0<0). As illustrated, main tap 501 integrates the current corresponding to Vin_p/n onto load capacitances C1/C2 when snhclk90_p is HIGH.

Figure 6B:
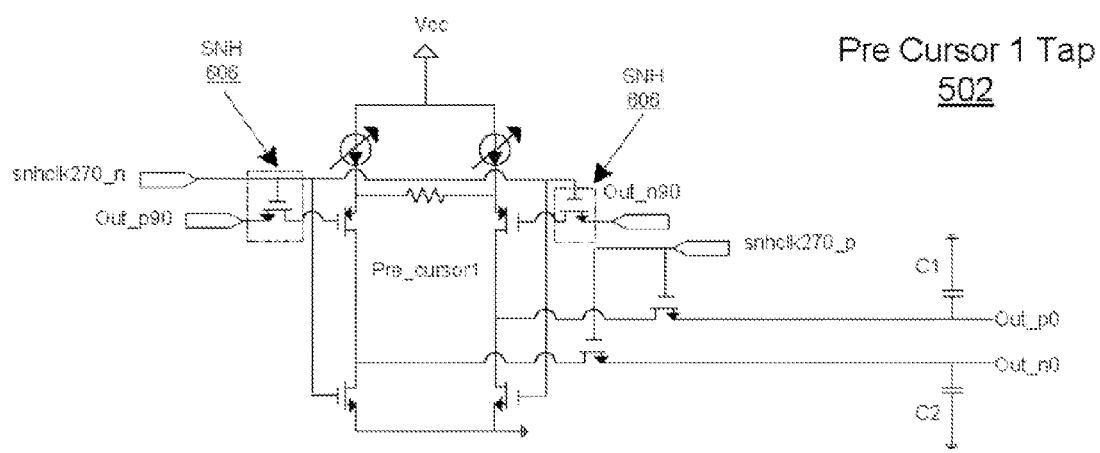
Figure 6C:
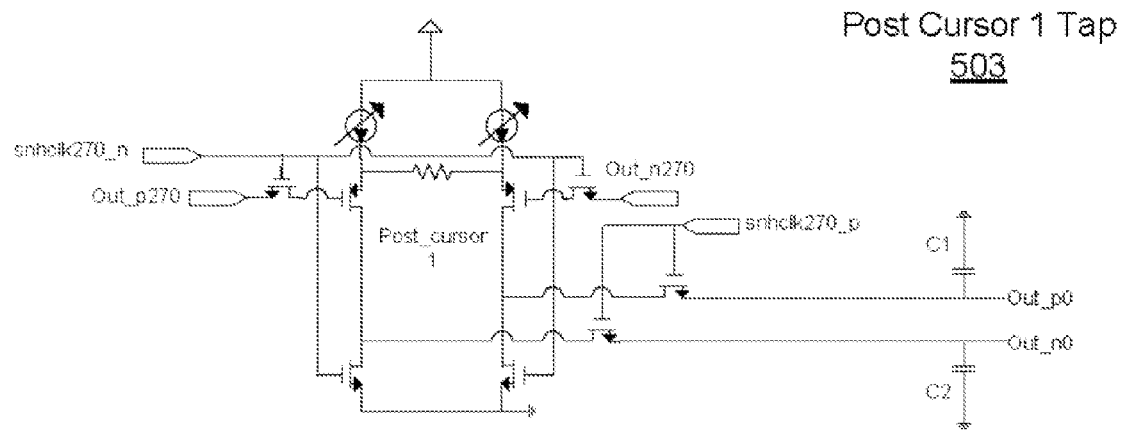
Figure 6D:
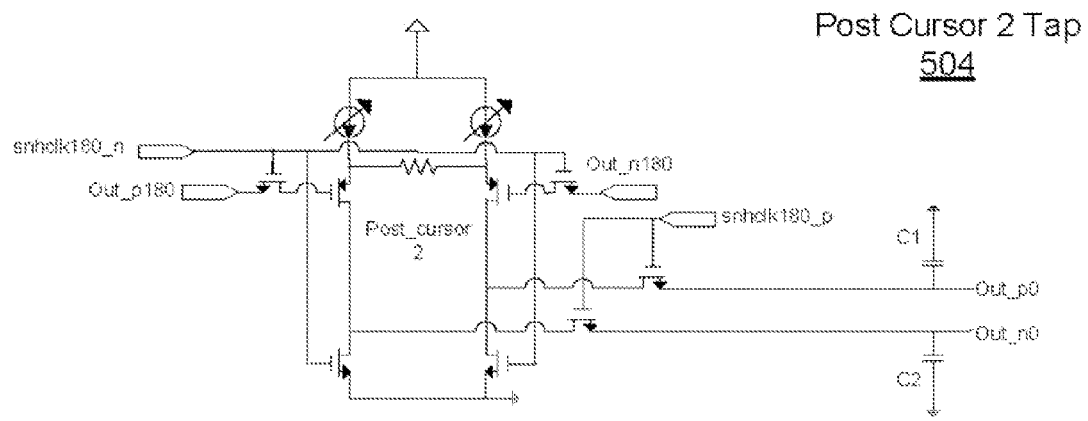

FIG. 6B is a block diagram illustrating an embodiment of pre cursor 1 tap 502. Pre cursor 1 tap 502 includes SNH 606 which tracks equalized signals out_p/n90 when snhclk270_n is HIGH, and latches them when snhclk270_n switches LOW. As illustrated, pre cursor tap 502 integrates out_p/n90 latched by SNH 606 when snhclk270_p is HIGH.

Figure 6E:
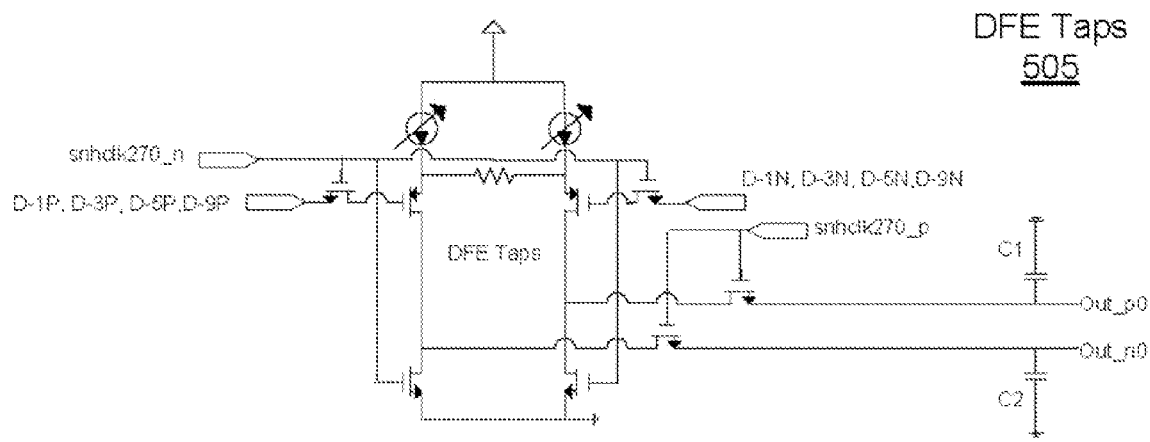
Figure 6F:
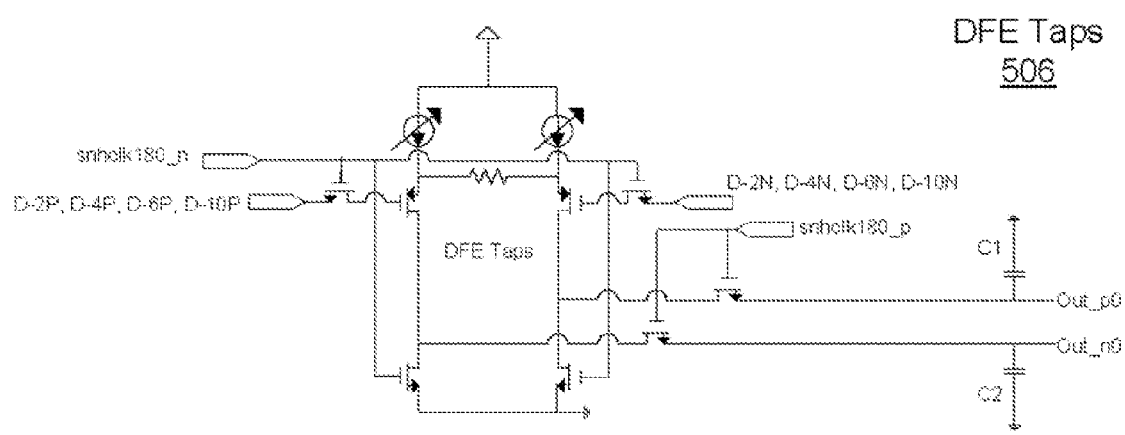
Figure 6G:
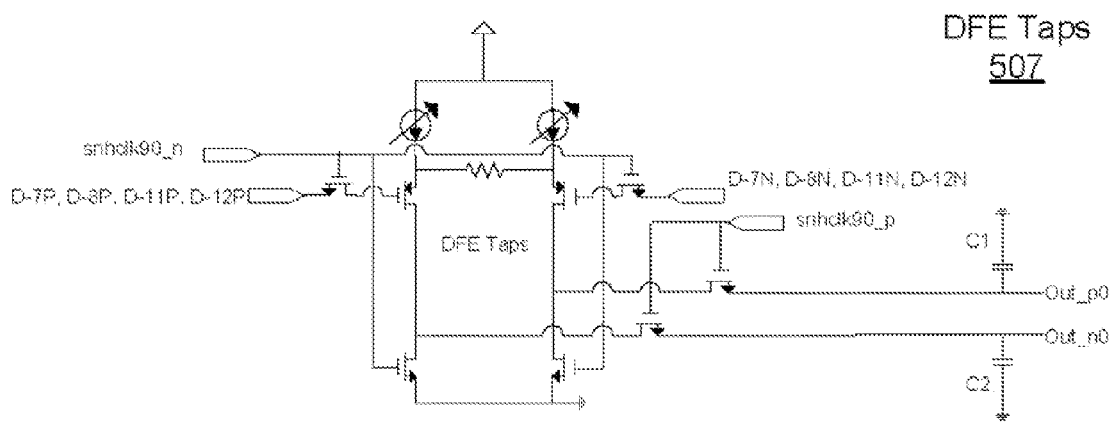
Figure 7A:
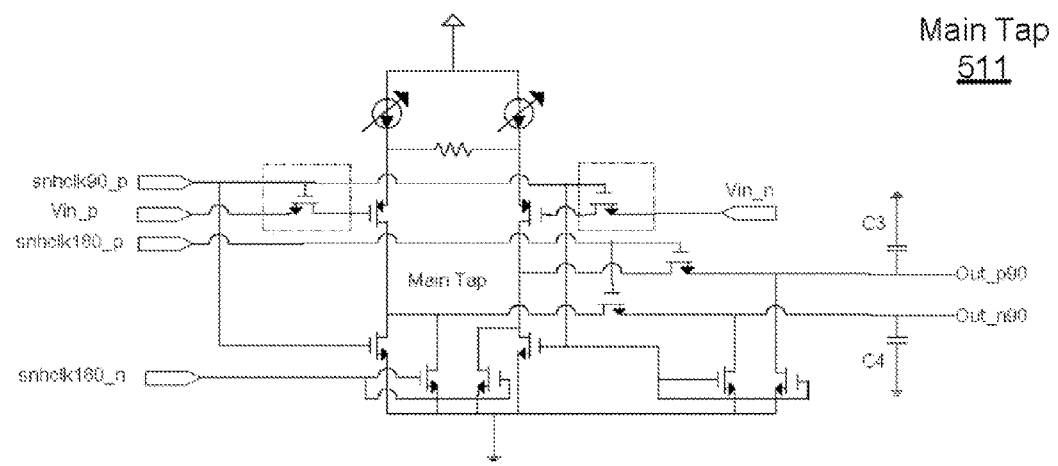
FIGS. 7A-7G are block diagrams illustrating an embodiment of branch 1.
Figure 7B:
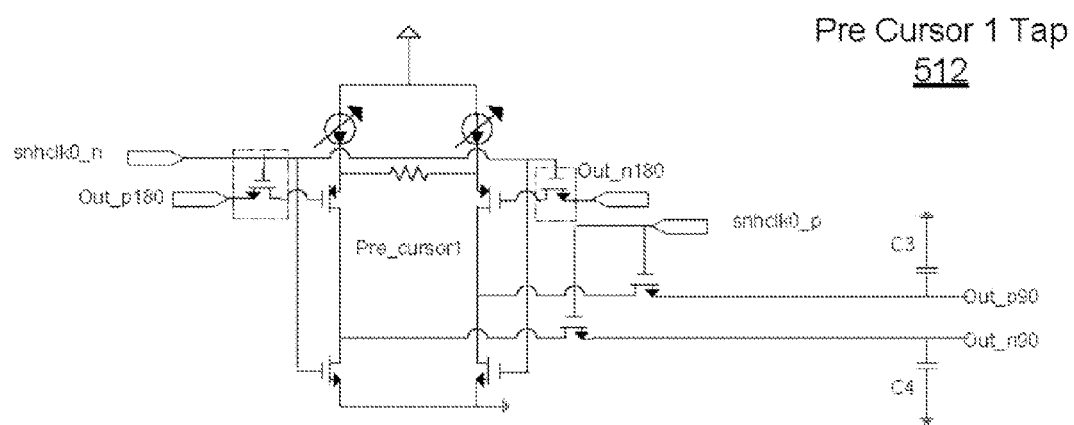
Figure 7C:
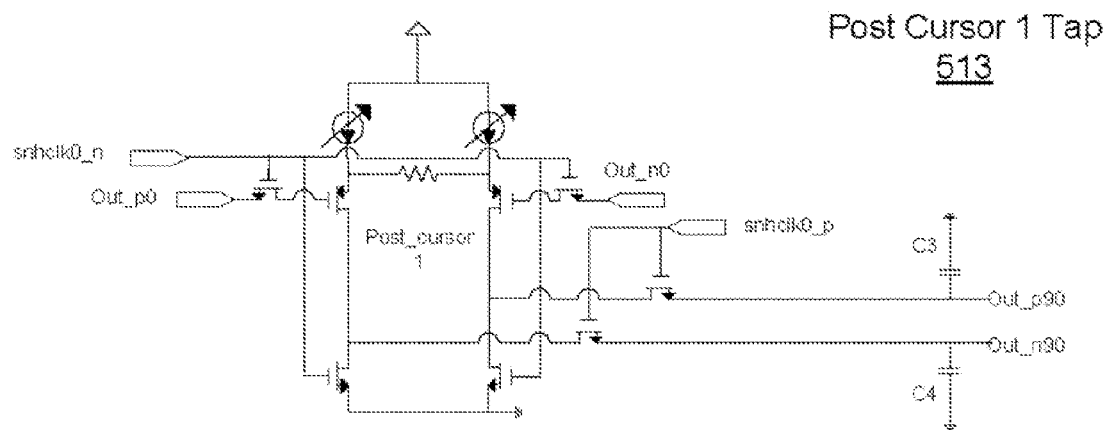
Figure 7D:
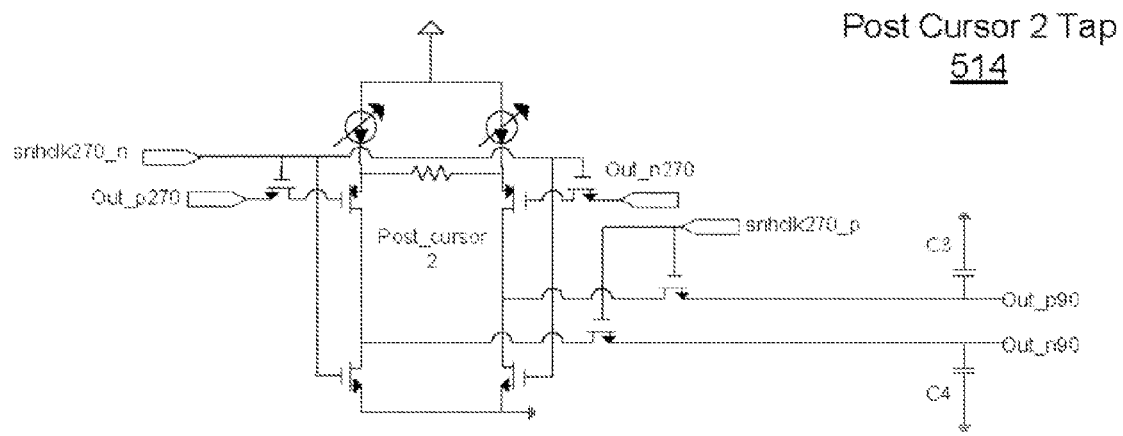
Figure 7E:
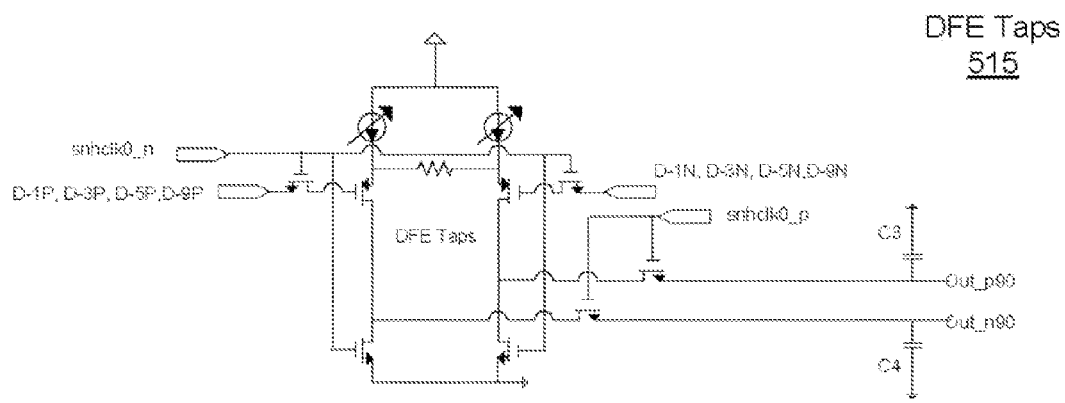
Figure 7F:
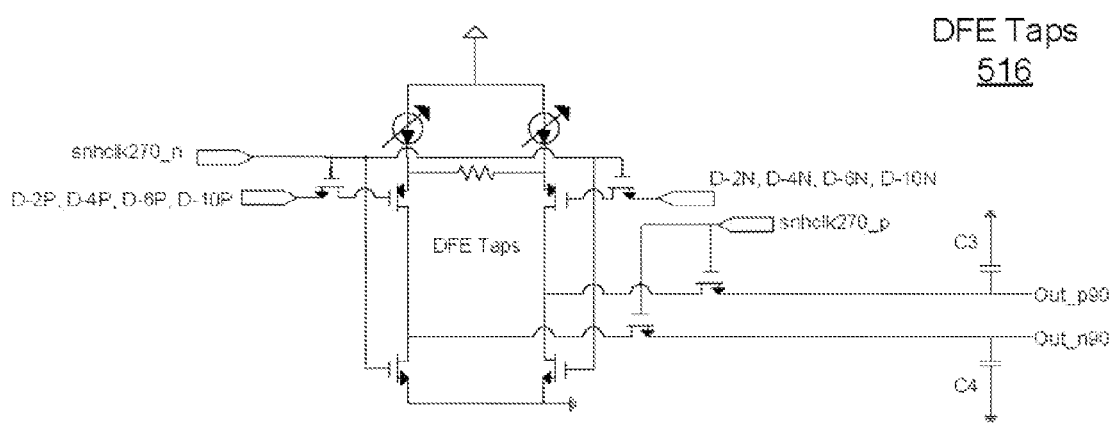
Figure 7G:
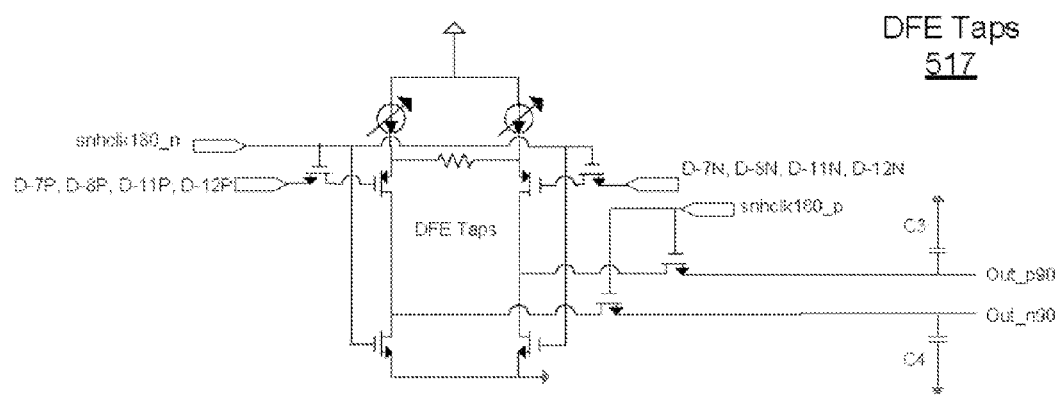
Figure 8A:
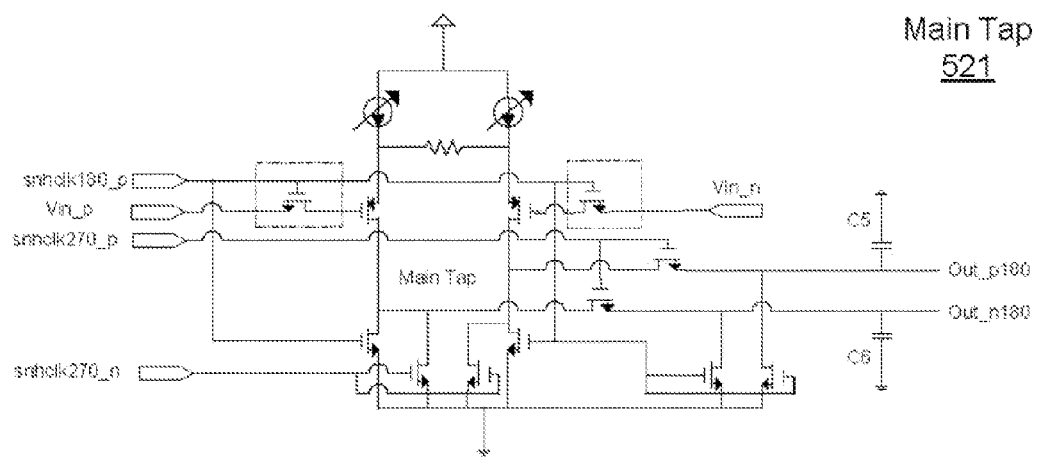
FIGS. 8A-8G are block diagrams illustrating an embodiment of branch 2.
Figure 8B:
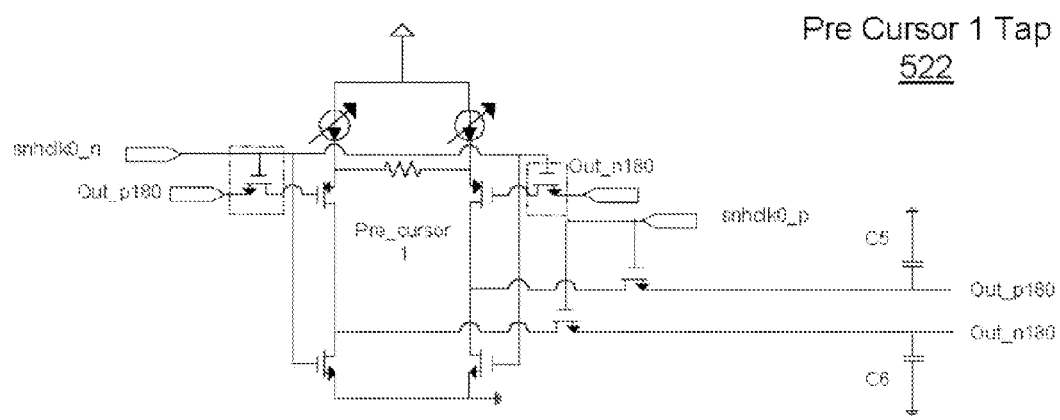
Figure 8C:
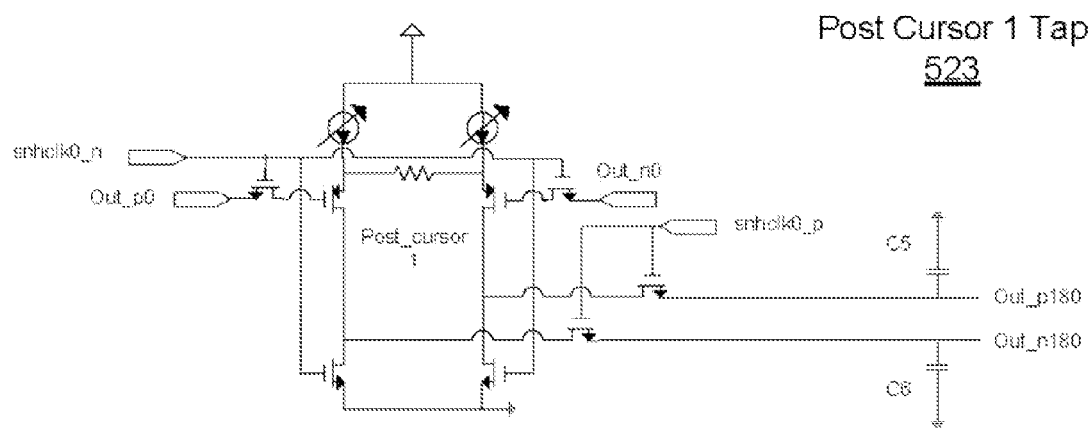
Figure 8D:
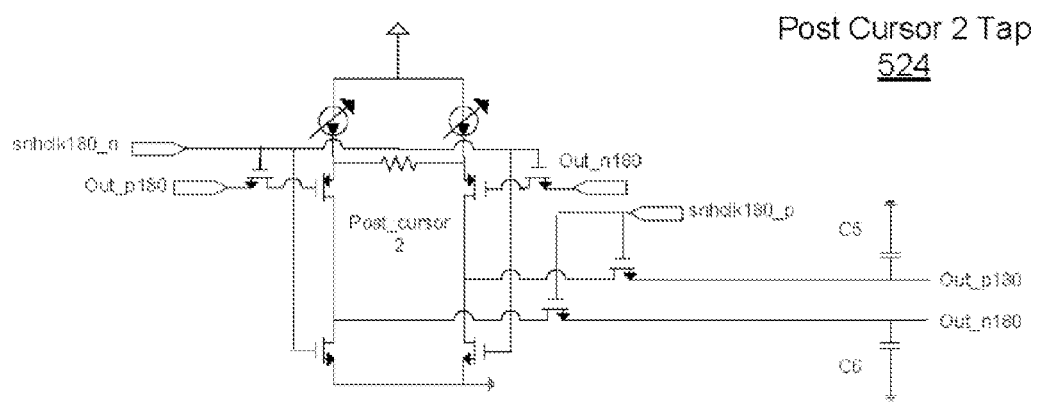
Figure 8E:
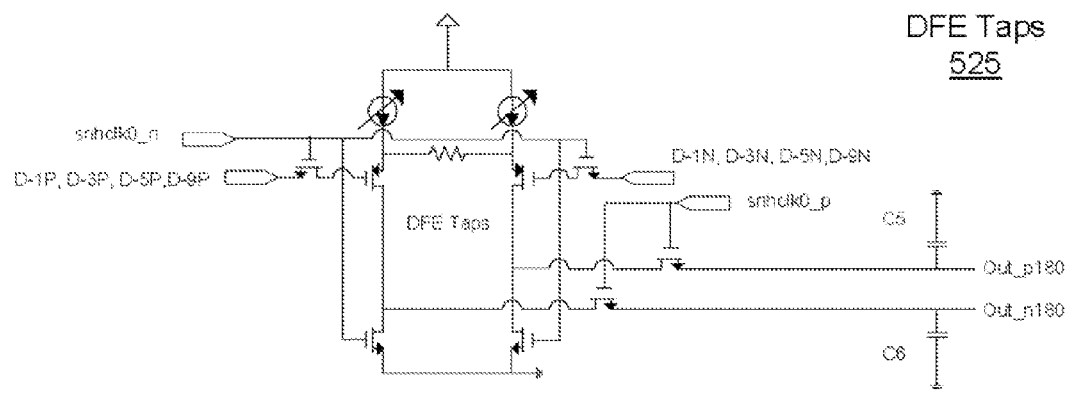
Figure 8F:
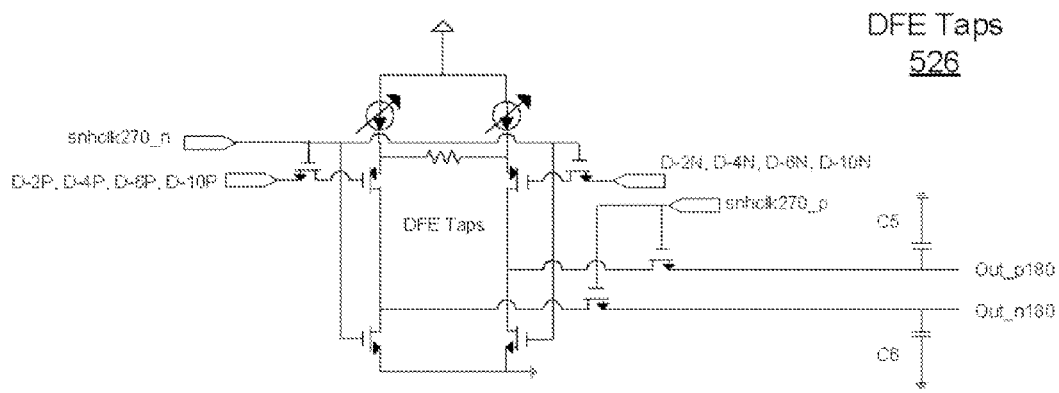
Figure 8G:
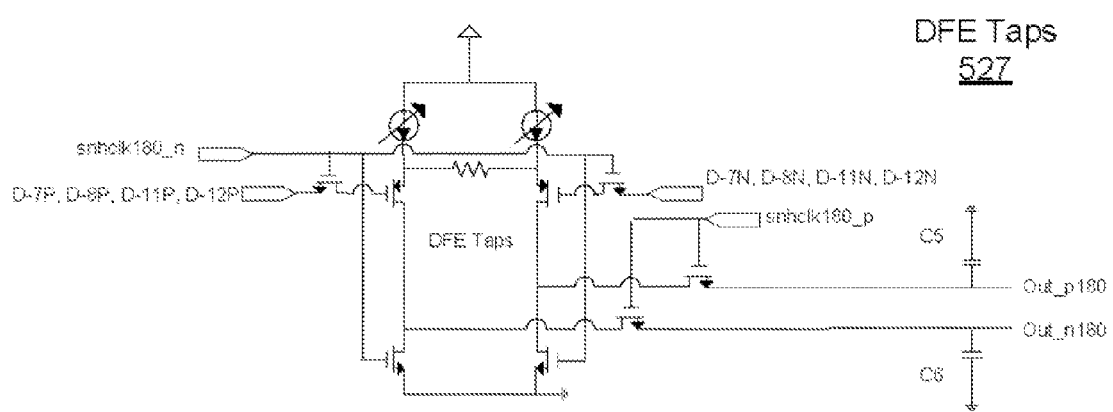
Figure 9A:
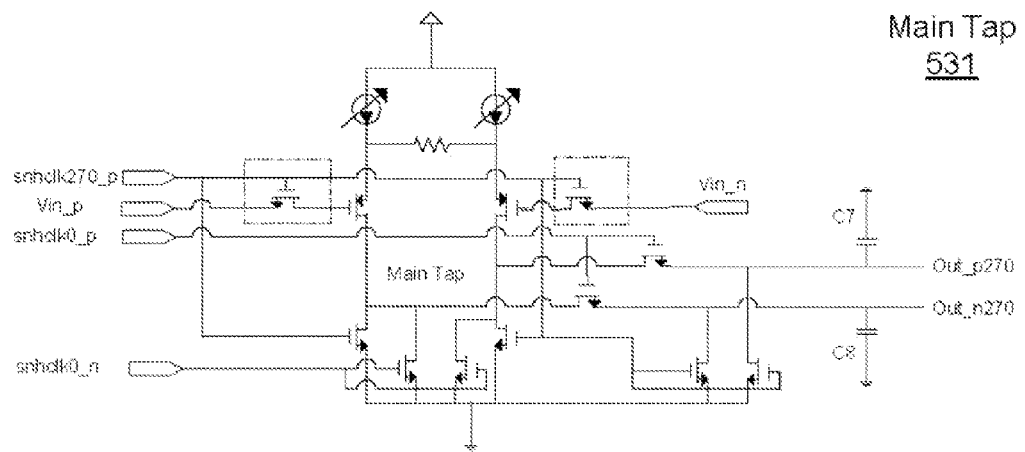
FIGS. 9A-9G are block diagrams illustrating an embodiment of branch 3.
Figure 9B:
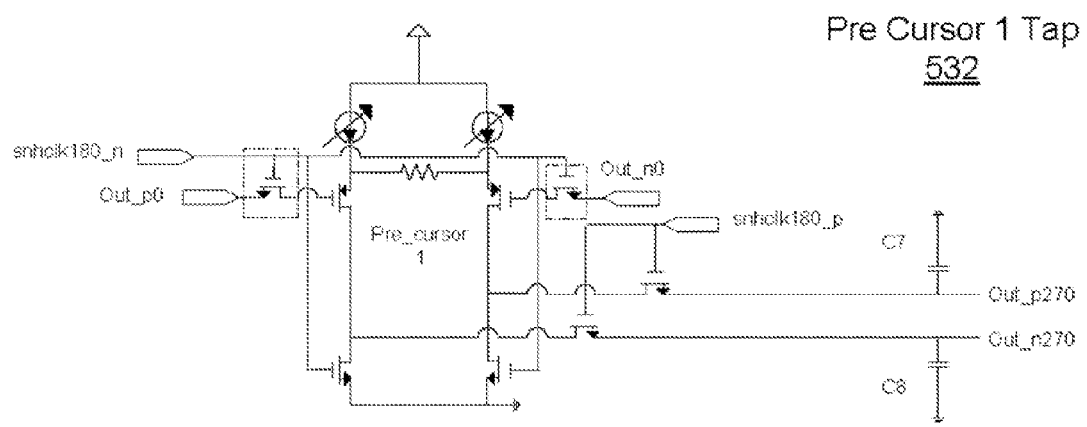
Figure 9C:
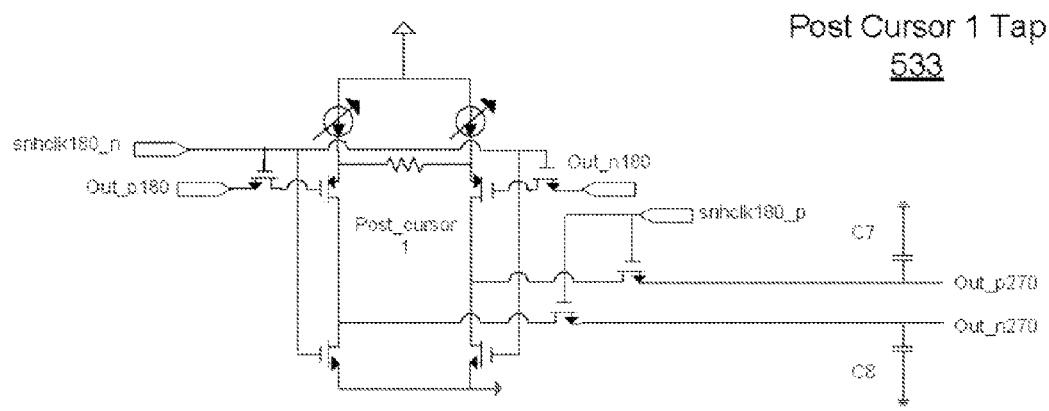
Figure 9D:
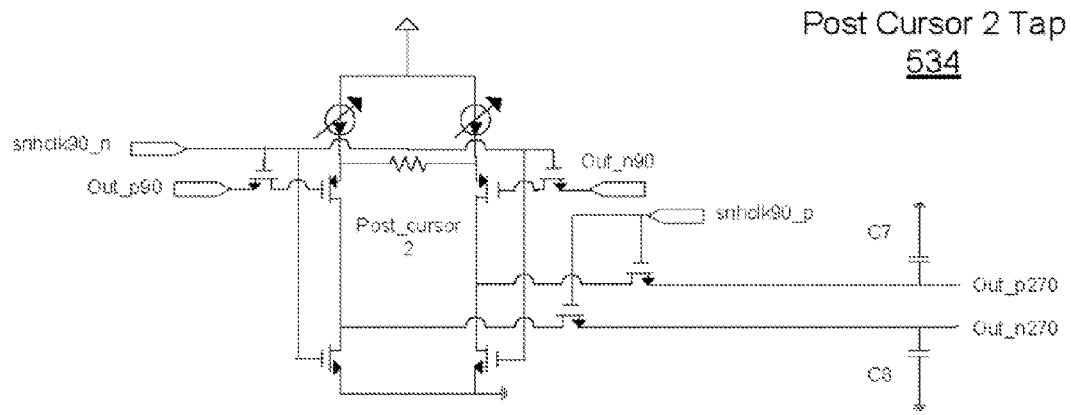
Figure 9E:
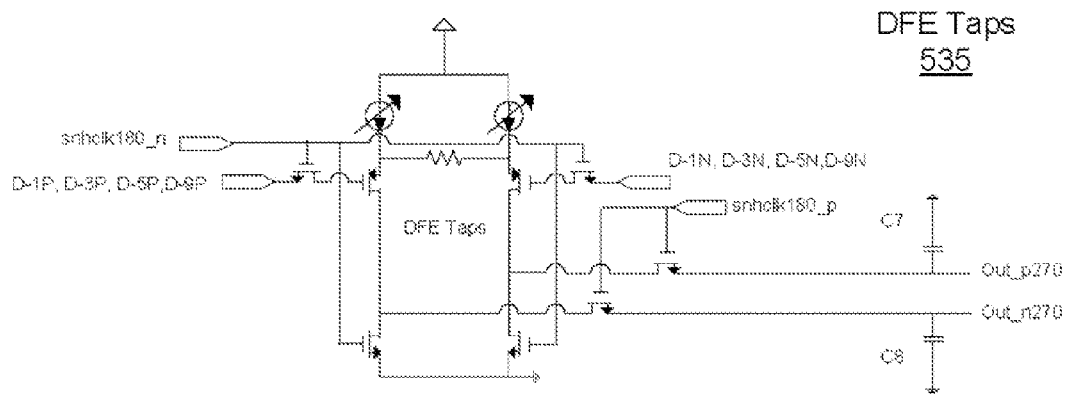
Figure 9F:
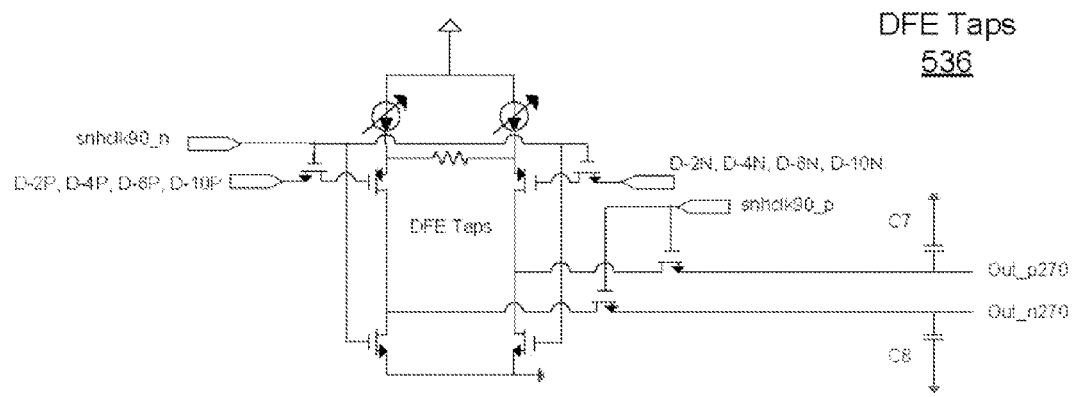
Figure 9G:
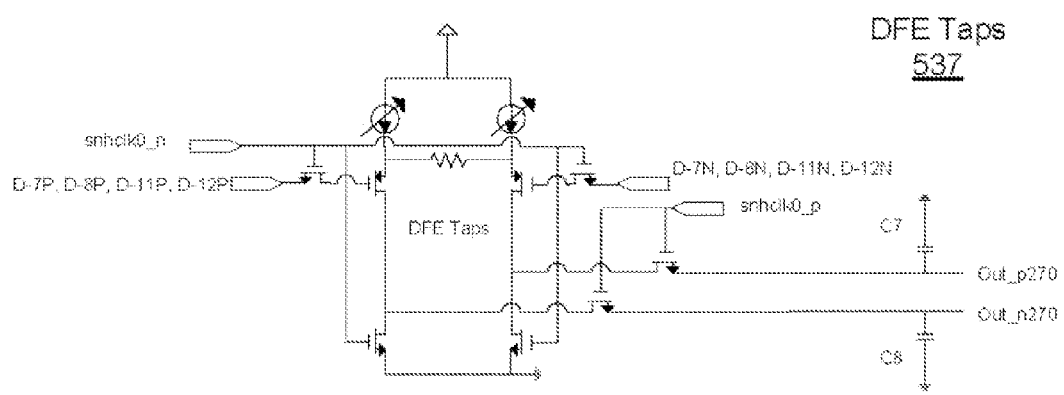

FIGS. 6C-6G illustrate one embodiment of the remaining taps of summer 320. These taps integrate the signals illustrated in a manner similar to the description of FIGS. 6A-6B. For the sake of brevity, we will not discuss them here. It is worth clarifying, however, that each of the DFE taps 505-507 may be implemented as multiple taps. For example, although FIG. 6E only illustrates one tap, in embodiments in which four DFE sampled signals are integrated, four taps may be implemented to integrate each DFE sampled signal. Thus, as illustrated in FIG. 6E, the four taps shall integrate the DFE sampled signals D-1p/n, D-3p/n, D-5p/n, and D-9p/n, respectively. Alternatively, the number of DFE sampled signals that are integrated may be different. For example, DFE tap 505 may, in some embodiments, integrate only DFE sampled signal D-1p/n.

FIGS. 7A-7G illustrate one embodiment of the taps of summer 321 (branch 90), FIGS. 8A-8G illustrate one embodiment of the taps of summer 322 (branch 180), and FIGS. 9A-9G illustrate one embodiment of the taps of summer 323 (branch 270). These taps integrate the current onto load capacitances C3-C8 in a similar manner to the taps described above herein with respect to FIGS. 6A-6G. There are differences, however, with respect to which signals are being integrated and during which UI. FIGS. 4 and 5 illustrate which signals are integrated by the various taps, and during which UI they are integrated.

Figure 10:
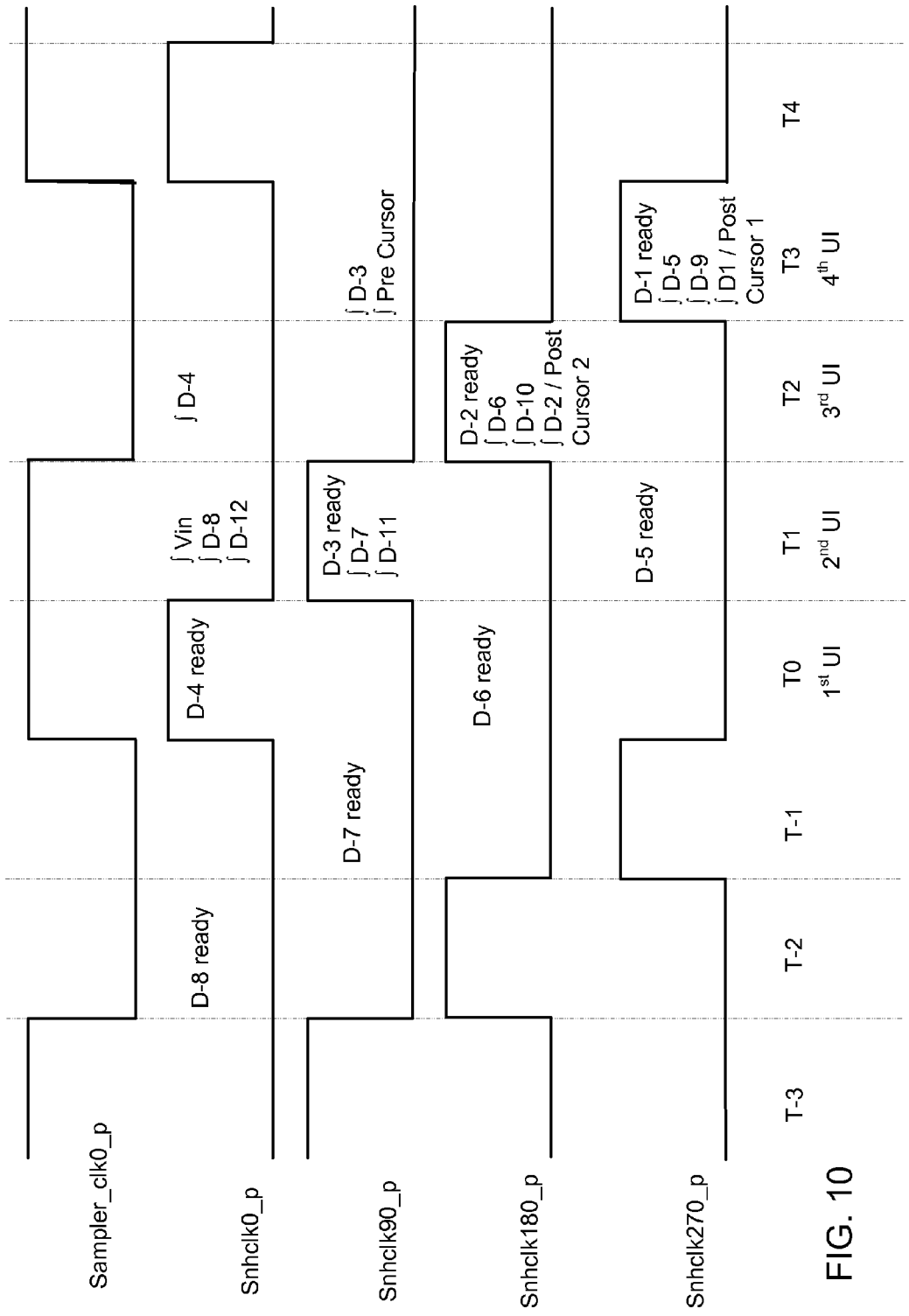
FIG. 10 is a timing diagram illustrating the timing relationship between clocks according to one embodiment.

FIG. 10 is a timing diagram illustrating exemplary clocking of summer 320 (branch 0). Reference to "D-x ready" means that equalized data D-x is ready for integration. "D-x" refers to the various outputs of DFE samplers illustrated in FIGS. 3A-3D. The row on which "D-x ready" appears denotes the branch from which D-x is coming. The column on which "D-x ready" appears denotes the time when D-x is ready to be integrated. Thus, for example, "D-4 ready" appears on row snhclk0_p (second row), which means that D-4 is provided by a DFE sampler of branch 0. The appearance of "D-4 ready" in the column T0 means that D-4 is ready to be integrated during T0 (the first UI) in the sequence. In FIG. 10, "ftap" means that the respective tap is enabled for integration. The row on which "ftap" appears denotes the branch that provides the equalized signal to be integrated. The column on which "ftap" appears denotes the UI during which the integration is performed. Thus, for example, "fD-4" appearing on row snhclk0 means branch 0 provides the signal D-4 to be integrated by DFE tap 506. The fact that "fD-4" appears in column T2 means that the integration of D-4 (by DFE tap 506) occurs during T2 (the third UI in the sequence). FIG. 10 illustrates differential pairs as a single ended signal for clarity. For example, "D-4 ready" means that both D-4p and D-4n are ready. And, "fD-4" means that D-4p and D-4n are integrated.

As discussed above, conventional equalizers have a DFE timing constraint of one UI, i.e., the signal sampled by data sampler must be feedback to DFE taps within one UI period. Sampled signals are available only one UI prior to being integrated. In systems operating at high data rates, this may not be sufficient time for integration. As illustrated in FIG. 10, the integrating timing of the embodiments described herein is designed such that for DFE tap 3 and above, the sampled signals are ready, i.e., fed back to the summer, at least two UI periods before the corresponding taps of the summer integrate them This integration timing reduces the DFE timing constraint for DFE tap 3 and above to at least two UIs. For post cursor 1, post cursor 2 and pre-cursor, FFEs with fully equalized signal are used as input to eliminate the one UI timing constraint.

During T0 (i.e., the first UI), snhclk0_p clock rises from LOW to HIGH. At the rising edge of snhclk0_p, branch 0 samplers (e.g., DFE samplers 304308 and 312) make a decision on whether the incoming signal Vin is either a "1" or "0," based on the final integration value from previous integration period. For example, DFE sampler 304 determines if out_0 is a "0" or "1" and latches the corresponding value onto D-4 at the rising edge of sampler_clk0_p. Thus, as illustrated in FIG. 10, D-4 is ready at T0. At the falling edge of snhclk0_p, the second and third sampler of branch 0 (e.g. DFE sampler 308 and 312) latch the corresponding values onto D-8 and D-12 respectively. Thus, as illustrated in FIG. 10, D-8/D-12 is ready at T-2. After out_0 is latched onto D-4 at the rising edge of sampler_clk0_p, the load capacitances C1 and C2 are discharged to Ground by main tap 501 during the first UI, getting them ready for the current round of integrations. While snhclk0_p clock is HIGH, SNH 605 of main tap 501 tracks the input signal Vin.

During T1 (i.e., the second UI), when snhclk0_p switches LOW, SNH 605 latches Vin, and integration by the main tap 501 of the current corresponding to input signal Vin starts for a duration of one UI. Put differently, main tap 501 starts integrating the current corresponding to Vin during the UI when snhclk90_p is HIGH, which is one UI delayed from snhclk0_p. This is denoted in FIG. 10 as "fVin." During the same UI when snhclk90_p is HIGH, D-7, D-8, D-11, and D-12 (outputs of DFE samplers 307, 308, 311, and 312, respectively) are integrated by DFE taps 507. This is denoted in FIG. 10 as "fD-7," "fD-8," "fD-11," and "fD-12," respectively.

As illustrated in FIG. 10, the DFE tap timing constraint is at least two UIs for DFE tap 3 and above, unlike conventional equalization architectures which have a strict one UI timing constraint. For example, D-7 is ready for integration at T-1, but it is not integrated until T1, which is two UIs later. Thus, FIG. 10 illustrates a clocking structure that relaxes the DFE tap timing constraint to at least two UIs, which is easy to meet even for very high speed data rate (such as OIF CEI 28 Gbps or 802.3bj 25 Gbps).

During T2 (the third UI), all taps within branch 180 complete their current integration process. The final value of branch 180 (i.e., out_180) is a signal that is fully equalized by the CTLE, FFE, and DFE taps 521-527. In one embodiment, out_180 is integrated by post cursor 2 tap 504 during the third UI (when snhclk180_p is HIGH). This is denoted in FIG. 10 as "5D-2/Post Cursor 2."

During the same third UI, DFE sampled signals D-4, D-6, and D-10 are integrated by DFE taps 506 (denoted in FIG. 10 as "fD-4," "fD-6," and "fD-10"). Again, these equalized signals are ready for integration at least two UIs earlier. For example, D-4 is ready at T0, which is two UIs earlier then when it is integrated at T2. It should be noted, however, that the integration of D-2 does not have this relaxed timing constraint. For example, D-2 is ready for integration at T2, the same UI that it is integrated. At high data rates, this timing constraint may not be met. Thus, in one embodiment, the integration of D-2 is disabled at high data rates. For lower data rates, D-2 integration may be enabled since the UI period is much larger. The selective integration of D-2 is denoted in FIG. 10 as "fD-2/Post Cursor 2" to clarify that at high data rates, only integration of out_180 by post cursor 2 tap 504 is performed because signal out_180 is the analog equivalent of D-2.

During T3 (the fourth UI), all integrations are done at branch 270. The final value of branch 270 (i.e., out_270) is a signal that is fully equalized by the CTLE, FFE, and DFE taps 531-537. In one embodiment, out_270 is integrated by post cursor 1 tap 503 (of branch 0) during the fourth UI (when snhclk270_p is HIGH). This is denoted in FIG. 10 as "fD1/Post Cursor 1."

During the same fourth UI, DFE sampled signals D-3, D-5, and D-9 are integrated by DFE taps 505 (denoted in FIG. 10 as "fD-3," "fD-5," and "fD-9"). Again, these equalized signals are ready for integration at least two UIs earlier. For example, D-3 is ready at T1, which is two UIs earlier then when it is integrated at T3. It should be noted, however, that the integration of D-1 does not have this relaxed timing constraint. For example, D-1 is ready for integration at T3, the same UI that it is integrated. At high data rates, this timing constraint may not be met. Thus, in one embodiment, the integration of D-1 is disabled at high data rates. For lower data rates, D-1 integration may be enabled since the UI period is much larger. The selective integration of D-1 is denoted in FIG. 10 as "fD-1/Post Cursor 1" to clarify that at high data rates, only integration of out_270 by post cursor 1 tap 503 is performed, because out_270 is the analog equivalent of D-1.

During the same fourth UI (T3), equalized signal out_90 is integrated by pre cursor tap 502 (as denoted by "fPre Cursor.") During T3, the integration by branch 90 (i.e., on Out_p/n90) has not been completed because only main tap 511 and DFE taps 517 have completed their current integration process. Pre cursor tap 512, post cursor 1 tap 513, post cursor 2 tap 514, DFE taps 515, and DFE taps 516 have not completed their integration yet. Pre cursor tap 502, however, is the only FFE tap in branch 0 which does not use fully equalized data (i.e., from Out_p/n90). Out_0 is equalized during T3, and latched by DFE sampler 304 during T4, marking the beginning of another equalization sequence.

FIG. 10 illustrates one embodiment of the clocking of branch 0. The clocking of branch 0 is not limited to the illustrated sequence with respect to which taps are enabled for integration during a particular UI. Nor is the clocking of branch 0 limited to the illustrated signals that are integrated by the particular taps that are enabled during each UI. Additionally, the clocking of branch 0 may be extended to operate in sequences other than four UIs.

FIG. 11 is a flow diagram illustrating a method 1100 for determining a value of a received data signal. For example, method 1100 may be performed by branch 0 of equalizer 215, such as DFE samplers 304, 308, 312, and summer 320. At block 1105, a first DFE sampler (e.g., DFE sampler 304) latches an equalized output (e.g., out_p/n0) of the summer. At block 1110, a second DFE sampler (e.g., DFE sampler 308) latches an output of the first DFE sampler (e.g., DFE sampler 304). At block 1115, a third DFE sampler (e.g., DFE sampler 312) latches an output of the second DFE sampler (e.g., DFE sampler 308). At block 1120, a summer (e.g., summer 320) integrates the output of the DFE samplers (e.g., DFE samplers 304, 308, and 312), the received signal, and equalized outputs from one ore more other branches (e.g., out_p/n90, out_p/n180, and out_p/n270).

Throughout the description, metal oxide semiconductor field effect transistors (MOSFETs, also commonly known simply as MOS) are illustrated as the building blocks of various logic. The logic blocks, however, are not so limited. For example, the logic blocks may be implemented using bipolar junction transistors (BJTs), or a combination of MOS and BJT transistors, commonly known as BiCMOS technology.

A receiver equalizer includes a plurality of branches for equalizing a received signal. The first branch comprises a first decision feedback equalizer (DFE) sampler coupled to a summer for latching an equalized output of the summer. In one embodiment, the first branch of the equalizer includes a second DFE sampler coupled to the first DFE sampler for latching an output of the first DFE sampler. In one embodiment, the first branch includes a third DFE sampler coupled to the second DFE sampler for latching an output of the second DFE sampler. The summer is coupled to the first, second, and third DFE sampler of the first branch for integrating the output of said DFE samplers, the received signal, and equalized outputs from other branches. The integrating occurs over a plurality of unit intervals (UIs).

The summer comprises a main tap for integrating the received signal during a second UI. The summer further comprises a first DFE tap for integrating the output of the second DFE sampler of the first branch during the second UI. In one embodiment, the summer comprises a second DFE tap for integrating the output of the third DFE sampler of the first branch during the second UI. In one embodiment, the summer further comprises a third DFE tap for integrating an output of a second DFE sampler of a second branch during the second UI. In one embodiment, the summer comprises a fourth DFE tap for integrating an output of a third DFE sampler of the second branch during the second UI.

The summer comprises a second post cursor tap for integrating an equalized output from a third branch during a third UI. The summer further comprises a fifth DFE tap for integrating the output of the first DFE sampler of the first branch during the third UI. In one embodiment, the summer comprises a sixth DFE tap for integrating an output of a first DFE sampler of the third branch during the third UI. In one embodiment, the summer further comprises a seventh DFE tap for integrating an output of a second DFE sampler of the third branch during the third UI. In one aspect of the invention, the summer comprises an eighth DFE tap for integrating an output of a third DFE sampler of the third branch during the third UI.

The summer comprises a pre cursor tap for integrating an equalized output from the second branch during a fourth UI. The summer comprises a first post cursor tap for integrating an equalized output from a fourth branch during the fourth UI. The summer further comprises a ninth DFE tap for integrating the output of a first DFE sampler of the second branch during the fourth UI. In one embodiment, the summer comprises a tenth DFE tap for integrating an output of a first DFE sampler of the fourth branch during the fourth UI. In one embodiment, the summer comprises an eleventh DFE tap for integrating an output of a second DFE sampler of the fourth branch during the fourth UI. In one aspect of the invention, the summer comprises a twelfth DFE tap for integrating an output of a third DFE sampler of the fourth branch during the fourth UI.

Various embodiments and aspects of the inventions have been described with reference to the drawings. The description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A receiver equalizer comprising a plurality of branches for equalizing a received signal, wherein a first branch comprises:
    a first decision feedback equalizer (DFE) sampler coupled to a summer, the first DFE sampler to latch an equalized output of the summer;
    a second DFE sampler coupled to the first DFE sampler, the second DFE sampler to latch an output of the first DFE sampler;
    a third DFE sampler coupled to the second DFE sampler, the third DFE sampler to latch an output of the second DFE sampler; and
    the summer coupled to the first, second, and third DFE samplers of the first branch, the summer to integrate the output of said DFE samplers, the received signal, and equalized outputs from one or more other branches, wherein the integrating occurs over a plurality of unit intervals (UIs),
    wherein the DFE samplers are clocked by a first clock and the summer is clocked by a second clock, the first clock having a different duty cycle than the second clock.

2. The receiver equalizer of claim 1, wherein the summer comprises a main tap, wherein the main tap is configured to reset the equalized output of the summer during a first UI, and integrate the received signal during a second UI, wherein the second UI is preceded by the first UI.

3. The receiver equalizer of claim 2, wherein the summer further comprises:
    a first DFE tap to integrate the output of the second DFE sampler of the first branch during the second UI; and
    a second DFE tap to integrate the output of the third DFE sampler of the first branch during the second UI.

4. The receiver equalizer of claim 3, wherein the summer further comprises:
    a third DFE tap to integrate an output of a second DFE sampler of a second branch during the second UI; and
    a fourth DFE tap to integrate an output of a third DFE sampler of the second branch during the second UI.

5. The receiver equalizer of claim 4, wherein the summer further comprises a second post cursor tap to integrate an equalized output from a third branch during a third UI, wherein the UI is preceded by the second UI.

6. The receiver equalizer of claim 5, wherein the summer further comprises:
    a fifth DFE tap to integrate the output of the first DFE sampler of the first branch during the third UI; and
    a sixth DFE tap to integrate an output of a first DFE sampler of the third branch during the third UI.

7. The receiver equalizer of claim 6, wherein the summer further comprises:
    a seventh DFE tap to integrate an output of a second DFE sampler of the third branch during the third UI; and
    an eighth DFE tap to integrate an output of a third DFE sampler of the third branch during the third UI.

8. The receiver equalizer of claim 7, wherein the summer further comprises a pre cursor tap to integrate an equalized output from the second branch during a fourth UI, wherein the fourth UI is preceded by the third UI.

9. The receiver equalizer of claim 8, wherein the summer further comprises a first post cursor tap to integrate an equalized output from a fourth branch during the fourth UI.

10. The receiver equalizer of claim 9, wherein the summer further comprises:
    a ninth DFE tap to integrate the output of a first DFE sampler of the second branch during the fourth UI; and a tenth DFE tap to integrate an output of a first DFE sampler of the fourth branch during the fourth UI.

11. The receiver equalizer of claim 10, wherein the summer further comprises:
an eleventh DFE tap to integrate an output of a second DFE sampler of the fourth branch during the fourth UI; and
a twelfth DFE tap to integrate an output of a third DFE sampler of the fourth branch during the fourth UI.

12. A method of equalizing a received signal, the method comprising:
latching, by a first decision feedback equalizer (DFE) sampler coupled to a summer, an equalized output of the summer;
latching, by a second DFE sampler coupled to the first DFE sampler, an output of the first DFE sampler;
latching, by a third DFE sampler coupled to the second DFE sampler, an output of the second DFE sampler; and
integrating, by the summer coupled to the first, second, and third DFE samplers of the first branch, the output of said DFE samplers, the received signal, and equalized outputs from one or more other branches, wherein the integrating occurs over a plurality of unit intervals (UIs),
wherein the DFE samplers are clocked by a first clock and the summer is clocked by a second clock, the first clock having a different duty cycle than the second clock.

13. The method of claim 12, wherein the summer comprises a main tap for resetting the equalized output of the summer during a first UI, and integrating the received signal during a second UI, wherein the second UI is preceded by the first UI.

14. The method of claim 13, wherein the summer further comprises:
a first DFE to integrate the output of the second DFE sampler of the first branch during the second UI; and
a second DFE tap to integrate the output of the third DFE sampler of the first branch during the second UI.

15. The method of claim 14, wherein the summer further comprises:
a third DFE tap to integrate an output of a second DFE sampler of a second branch during the second UI; and
a fourth DFE tap to integrate an output of a third DFE sampler of the second branch during the second UI.

16. The method of claim 15, wherein the summer further comprises a second post cursor tap to integrate an equalized output from a third branch during a third UI, wherein the third UI is preceded by the second UI.

17. The method of claim 16, wherein the summer further comprises:
a fifth DFE tap to integrate the output of the first DFE sampler of the first branch during the third UI; and
a sixth DFE tap to integrate an output of a first DFE sampler of the third branch during the third UI.

18. A computer system comprising of a plurality of transceivers, each transceiver including a receiver equalizer comprising a plurality of branches for equalizing a received signal, wherein a first branch comprises:
a first decision feedback equalizer (DFE) sampler coupled to a summer, the first DFE sampler to latch an equalized output of the summer;
a second DFE sampler coupled to the first DFE sampler, the second DFE sampler to latch an output of the first DFE sampler;
a third DFE sampler coupled to the second DFE sampler, the third DFE sampler to latch an output of the second DFE sampler; and
the summer coupled to the first, second, and third DFE samplers of the first branch, the summer to integrate the output of said DFE samplers, the received signal, and equalized outputs from one or more other branches, wherein the integrating occurs over a plurality of unit intervals (UIs),
wherein the DFE samplers are clocked by a first clock and the summer is clocked by a second clock, the first clock having a different duty cycle than the second clock.

19. The computer system of claim 18, wherein the summer comprises a main tap, wherein the main tap is configured to reset the equalized output of the summer during a first UI, and integrate the received signal during a second UI, wherein the second UI is preceded by the first UI.

20. The computer system of claim 19, wherein the summer further comprises:
a first DFE tap to integrate the output of the second DFE sampler of the first branch during the second UI; and
a second DFE tap to integrate the output of the third DFE sampler of the first branch during the second UI.

21. The computer system of claim 20, wherein the summer further comprises:
a third DFE tap to integrate an output of a second DFE sampler of a second branch during the second UI; and
a fourth DFE tap to integrate an output of a third DFE sampler of the second branch during the second UI.

22. The computer system of claim 21, wherein the summer further comprises a second post cursor tap to integrate an equalized output from a third branch during a third UI, wherein the UI is preceded by the second UI.

23. The computer system of claim 22, wherein the summer further comprises:
a fifth DFE tap to integrate the output of the first DFE sampler of the first branch during the third UI; and
a sixth DFE tap to integrate an output of a first DFE sampler of the third branch during the third UI.

24. The computer system of claim 23, wherein the summer further comprises:
a seventh DFE tap to integrate an output of a second DFE sampler of the third branch during the third UI; and
an eighth DFE tap to integrate an output of a third DFE sampler of the third branch during the third UI.

25. The computer system of claim 24, wherein the summer further comprises a pre cursor tap to integrate an equalized output from the second branch during a fourth UI, wherein the fourth UI is preceded by the third UI.

* * * * *